US009988776B2

(12) United States Patent
Holland et al.

(10) Patent No.: US 9,988,776 B2
(45) Date of Patent: Jun. 5, 2018

(54) WIND SCREENS FOR PHOTOVOLTAIC ARRAYS AND METHODS THEREOF

(71) Applicant: Alion Energy, Inc., Richmond, CA (US)

(72) Inventors: Rodney Hans Holland, Novato, CA (US); Sean Bailey, Emeryville, CA (US)

(73) Assignee: Alion Energy, Inc., Richmond, CA (US)

( * ) Notice: Subject to any disclaimer, the term of this patent is extended or adjusted under 35 U.S.C. 154(b) by 0 days. days.

(21) Appl. No.: 15/261,257

(22) Filed: Sep. 9, 2016

(65) Prior Publication Data

US 2017/0073911 A1 Mar. 16, 2017

Related U.S. Application Data

(60) Provisional application No. 62/217,322, filed on Sep. 11, 2015.

(51) Int. Cl.
| | |
|---|---|
| *E01F 7/02* | (2006.01) |
| *H02S 20/20* | (2014.01) |
| *H02S 40/00* | (2014.01) |
| *E04H 17/14* | (2006.01) |
| *F24J 2/52* | (2006.01) |

(Continued)

(52) U.S. Cl.
CPC ......... *E01F 7/025* (2013.01); *E04H 17/1404* (2013.01); *F24J 2/52* (2013.01); *H02S 20/10* (2014.12); *H02S 20/20* (2014.12); *H02S 20/23* (2014.12); *H02S 40/00* (2013.01); *Y02B 10/12* (2013.01)

(58) Field of Classification Search
CPC ... E01F 7/025; E01F 7/02; E01F 13/02; E01F 13/022; E01F 13/024; E01F 13/04; E01F 15/083; H02S 20/00; H02S 40/00; H02S 20/24; F24J 2/4638; F24J 2/5235; F24J 2/5237; F24J 2/5239
See application file for complete search history.

(56) References Cited

U.S. PATENT DOCUMENTS

| | | |
|---|---|---|
| 3,267,824 A | 8/1966 | Hudis |
| 3,334,217 A | 1/1967 | Bickler et al. |
| 3,516,340 A | 6/1970 | Perkins |

(Continued)

FOREIGN PATENT DOCUMENTS

| | | |
|---|---|---|
| CN | 101858659 | 10/2010 |
| CN | 202019322 | 10/2011 |

(Continued)

OTHER PUBLICATIONS

Chinese Patent Office, Examination Report for GC 2011-19056, dated May 27, 2017.

(Continued)

*Primary Examiner* — Brian D Mattei
(74) *Attorney, Agent, or Firm* — Jones Day

(57) ABSTRACT

Wind screen for one or more photovoltaic arrays and method thereof. For example, a wind screen for one or more photovoltaic arrays includes a screen foundation including a concrete block, and one or more perforation blocks on the concrete block. In another example, the wind screen is configured to cover at least a first side of each array of the one or more photovoltaic arrays.

28 Claims, 15 Drawing Sheets

(51) Int. Cl.
*H02S 20/23* (2014.01)
*H02S 20/10* (2014.01)

(56) References Cited

U.S. PATENT DOCUMENTS

| | | | |
|---|---|---|---|
| 3,540,360 A | 11/1970 | Snow et al. | |
| 3,951,506 A | 4/1976 | Bennett et al. | |
| 4,145,021 A | 3/1979 | Gaechter et al. | |
| 4,219,926 A | 9/1980 | Bloch et al. | |
| 4,279,347 A | 7/1981 | Appleman et al. | |
| 4,290,416 A | 9/1981 | Maloney et al. | |
| 4,296,270 A | 10/1981 | Kohler et al. | |
| 4,301,322 A | 11/1981 | Amick et al. | |
| 4,301,409 A | 11/1981 | Miller et al. | |
| 4,371,139 A | 2/1983 | Clark | |
| 4,421,943 A | 12/1983 | Withjack et al. | |
| 4,422,614 A | 12/1983 | Santos | |
| 4,496,063 A | 1/1985 | Ishii et al. | |
| 4,664,270 A | 5/1987 | Voelz | |
| 4,667,834 A | 5/1987 | Lanigan et al. | |
| 4,676,713 A | 6/1987 | Voelpel | |
| 4,706,825 A | 11/1987 | Johnson | |
| 4,876,143 A | 10/1989 | Sugita et al. | |
| 4,877,365 A | 10/1989 | Lanigan, Jr. et al. | |
| 4,880,346 A | 11/1989 | Brassette et al. | |
| 4,954,009 A * | 9/1990 | Kellison | E01F 7/06 256/13.1 |
| 4,995,377 A | 2/1991 | Eiden et al. | |
| 5,022,781 A * | 6/1991 | Smith | E01F 9/669 181/210 |
| 5,125,608 A | 6/1992 | McMaster et al. | |
| 5,143,556 A | 9/1992 | Matlin | |
| 5,152,109 A | 10/1992 | Boers | |
| D335,541 S | 5/1993 | Rosario-Cartagena | |
| 5,228,924 A | 7/1993 | Barker et al. | |
| 5,232,519 A | 8/1993 | Glatfelter et al. | |
| 5,257,891 A | 11/1993 | Baumann et al. | |
| 5,361,704 A | 11/1994 | Bounds | |
| 5,460,660 A | 10/1995 | Albright et al. | |
| 5,501,744 A | 3/1996 | Albright et al. | |
| 5,505,788 A | 4/1996 | Dinwoodie | |
| 5,568,713 A | 10/1996 | Gagne et al. | |
| 5,593,901 A | 1/1997 | Oswald et al. | |
| 5,715,958 A | 2/1998 | Feider et al. | |
| 5,800,631 A | 9/1998 | Yamada et al. | |
| 5,816,769 A | 10/1998 | Bauer et al. | |
| 5,826,734 A | 10/1998 | Baumann et al. | |
| 6,037,578 A | 3/2000 | Grandjean et al. | |
| 6,046,399 A | 4/2000 | Kapner | |
| 6,058,930 A | 5/2000 | Shingleton | |
| 6,111,189 A | 8/2000 | Garvison et al. | |
| 6,149,338 A * | 11/2000 | Anderson | E01F 8/0064 256/1 |
| 6,201,181 B1 | 3/2001 | Azzam et al. | |
| 6,233,502 B1 | 5/2001 | Yim | |
| 6,495,750 B1 | 12/2002 | Dinwoodie | |
| 6,570,084 B2 * | 5/2003 | Dinwoodie | F24J 2/523 136/244 |
| 6,590,363 B2 | 7/2003 | Teramoto | |
| 6,639,421 B1 | 10/2003 | Yoshino et al. | |
| 6,722,357 B2 | 4/2004 | Shingleton | |
| 6,730,841 B2 | 5/2004 | Heckeroth | |
| 6,809,251 B2 | 10/2004 | Dinwoodie | |
| 6,962,461 B2 * | 11/2005 | Choi | E01F 7/06 256/13.1 |
| 7,086,675 B2 | 8/2006 | Jacobs | |
| 7,234,275 B1 * | 6/2007 | Haggy | E01F 13/022 160/135 |
| 7,252,083 B2 | 8/2007 | Hayden | |
| 7,309,850 B2 | 12/2007 | Sinton et al. | |
| 7,374,137 B2 | 5/2008 | Staney | |
| 7,411,408 B2 | 8/2008 | Shimotomai et al. | |
| 7,476,832 B2 | 1/2009 | Vendig et al. | |
| 7,492,120 B2 | 2/2009 | Benn et al. | |
| 7,531,741 B1 | 5/2009 | Melton et al. | |
| 7,546,929 B2 | 6/2009 | Wierzba et al. | |
| 7,712,807 B2 | 5/2010 | Perlman et al. | |
| 7,799,987 B1 | 9/2010 | Hines et al. | |
| 7,814,899 B1 | 10/2010 | Port | |
| 7,888,588 B2 | 2/2011 | Shingleton | |
| 7,898,212 B2 | 3/2011 | Benn et al. | |
| 7,963,578 B2 | 6/2011 | Wells et al. | |
| 8,006,624 B2 | 8/2011 | Sin | |
| 8,203,237 B1 | 6/2012 | Cowles | |
| 8,245,459 B2 | 8/2012 | Belikoff et al. | |
| 8,324,496 B1 * | 12/2012 | Gross | F24J 2/4638 126/571 |
| 8,371,076 B2 | 2/2013 | Jones et al. | |
| 8,407,950 B2 | 4/2013 | Hartelius | |
| 8,464,496 B2 | 6/2013 | Cusson et al. | |
| 8,492,645 B1 | 7/2013 | Strahm | |
| 8,500,918 B1 | 8/2013 | Meller et al. | |
| 8,550,419 B2 | 10/2013 | Hausner et al. | |
| 8,573,545 B2 | 11/2013 | Walquist et al. | |
| 8,578,928 B2 | 11/2013 | Lumbrems | |
| 8,607,512 B2 | 12/2013 | Batut | |
| 8,609,977 B2 | 12/2013 | Jones et al. | |
| 8,635,818 B2 | 1/2014 | Wildes | |
| 8,657,991 B2 | 2/2014 | Potter et al. | |
| 8,752,343 B2 | 6/2014 | Kuan et al. | |
| 8,763,601 B2 | 7/2014 | Doyle | |
| 8,894,424 B2 | 11/2014 | DuPont | |
| 8,962,972 B2 | 2/2015 | Sagayama | |
| 9,038,332 B1 * | 5/2015 | Littlestone | F41H 5/0457 52/202 |
| 9,192,966 B2 | 11/2015 | Zanatta | |
| 9,324,892 B2 * | 4/2016 | Powrozek | F24J 2/5233 |
| 9,343,592 B2 | 5/2016 | Hunt | |
| 9,352,941 B2 | 5/2016 | Wheeler et al. | |
| 9,355,873 B2 | 5/2016 | Eitelhuber | |
| 9,453,660 B2 | 9/2016 | French et al. | |
| 9,462,734 B2 | 10/2016 | Swahn et al. | |
| 9,641,123 B2 | 5/2017 | Swahn et al. | |
| 9,655,292 B2 | 5/2017 | Swahn et al. | |
| 9,657,967 B2 | 5/2017 | Adriani et al. | |
| 2002/0121063 A1 * | 9/2002 | Mathias | E01F 13/022 52/578 |
| 2003/0075211 A1 | 4/2003 | Makita et al. | |
| 2003/0097813 A1 | 5/2003 | Phelan et al. | |
| 2004/0197140 A1 * | 10/2004 | Maleska | E01F 15/083 404/6 |
| 2004/0250491 A1 | 12/2004 | Diaz et al. | |
| 2005/0061360 A1 | 3/2005 | Horioka et al. | |
| 2005/0126621 A1 * | 6/2005 | Dinwoodie | F24J 2/461 136/251 |
| 2005/0217716 A1 * | 10/2005 | Masuda | F24J 2/5235 136/244 |
| 2005/0268959 A1 | 12/2005 | Aschenbrenner et al. | |
| 2006/0054162 A1 | 3/2006 | Romeo | |
| 2006/0070621 A1 | 4/2006 | Neumann et al. | |
| 2006/0174931 A1 | 8/2006 | Mapes et al. | |
| 2006/0290344 A1 | 12/2006 | Shimotomai et al. | |
| 2007/0012352 A1 | 1/2007 | Wohlgemuth et al. | |
| 2007/0215145 A1 | 9/2007 | Hayden | |
| 2007/0283996 A1 | 12/2007 | Hachtmann et al. | |
| 2008/0010915 A1 | 1/2008 | Liebendorfer | |
| 2008/0023069 A1 | 1/2008 | Terada et al. | |
| 2008/0040990 A1 | 2/2008 | Vendig et al. | |
| 2008/0053517 A1 | 3/2008 | Plaisted et al. | |
| 2008/0087320 A1 | 4/2008 | Mapes et al. | |
| 2008/0099063 A1 | 5/2008 | Armstrong et al. | |
| 2008/0121273 A1 | 5/2008 | Plaisted et al. | |
| 2008/0135084 A1 | 6/2008 | Scharlack | |
| 2008/0156365 A1 | 7/2008 | Scholz et al. | |
| 2008/0233429 A1 | 9/2008 | Oguma et al. | |
| 2008/0245405 A1 | 10/2008 | Garvison et al. | |
| 2008/0271774 A1 | 11/2008 | Kalkanoglu et al. | |
| 2008/0306700 A1 | 12/2008 | Kawam et al. | |
| 2008/0308091 A1 | 12/2008 | Corio | |
| 2009/0014057 A1 | 1/2009 | Croft et al. | |
| 2009/0032100 A1 | 2/2009 | Oak | |
| 2009/0114261 A1 | 5/2009 | Stancel et al. | |
| 2009/0139557 A1 | 6/2009 | Rose et al. | |
| 2009/0173831 A1 | 7/2009 | Roseman | |

(56) References Cited

U.S. PATENT DOCUMENTS

| | | |
|---|---|---|
| 2009/0191030 A1 | 7/2009 | Bluck et al. |
| 2009/0205270 A1 | 8/2009 | Shaw et al. |
| 2009/0223142 A1 | 9/2009 | Shingleton et al. |
| 2009/0260671 A1 | 10/2009 | Green et al. |
| 2009/0282755 A1 | 11/2009 | Abbott et al. |
| 2009/0293932 A1 | 12/2009 | Augenbraun et al. |
| 2009/0293941 A1 | 12/2009 | Luch |
| 2009/0308430 A1 | 12/2009 | Everett et al. |
| 2010/0031996 A1 | 2/2010 | Basol |
| 2010/0043781 A1 | 2/2010 | Jones et al. |
| 2010/0108118 A1 | 5/2010 | Luch |
| 2010/0127142 A1 | 5/2010 | Genschorek |
| 2010/0147286 A1 | 6/2010 | Xiang et al. |
| 2010/0175337 A1 | 7/2010 | Mascolo et al. |
| 2010/0175738 A1 | 7/2010 | Huss et al. |
| 2010/0206294 A1 | 8/2010 | Blair et al. |
| 2010/0236183 A1 | 9/2010 | Cusson et al. |
| 2010/0252092 A1 | 10/2010 | Lenox et al. |
| 2010/0269429 A1 | 10/2010 | Belikoff et al. |
| 2010/0269888 A1 | 10/2010 | Johnston, Jr. |
| 2010/0269891 A1 | 10/2010 | Kinard et al. |
| 2010/0275975 A1 | 11/2010 | Monschke et al. |
| 2010/0281791 A1 | 11/2010 | Intagliata et al. |
| 2010/0319277 A1 | 12/2010 | Suarez et al. |
| 2010/0325797 A1 | 12/2010 | Home |
| 2011/0088688 A1 | 4/2011 | Sha et al. |
| 2011/0126378 A1 | 6/2011 | Ota |
| 2011/0126884 A1 | 6/2011 | Dritsas |
| 2011/0147553 A1 | 6/2011 | Ostermeier et al. |
| 2011/0162691 A1 | 7/2011 | Hartelius |
| 2011/0173900 A1 | 7/2011 | Plaisted et al. |
| 2011/0183540 A1 | 7/2011 | Keenihan et al. |
| 2011/0194900 A1 | 8/2011 | French |
| 2011/0264306 A1 | 10/2011 | Bagge |
| 2011/0284057 A1 | 11/2011 | Swahn et al. |
| 2011/0309215 A1 | 12/2011 | Lu et al. |
| 2012/0027550 A1 | 2/2012 | Bellacicco et al. |
| 2012/0034799 A1 | 2/2012 | Hunt |
| 2012/0037214 A1 | 2/2012 | Sagayama |
| 2012/0056638 A1 | 3/2012 | Swahn |
| 2012/0067738 A1 | 3/2012 | Field |
| 2012/0090176 A1 | 4/2012 | Stancel et al. |
| 2012/0125409 A1 | 5/2012 | Belschner et al. |
| 2012/0131866 A1 | 5/2012 | Batut |
| 2012/0132246 A1 | 5/2012 | Hunt et al. |
| 2012/0132262 A1 | 5/2012 | Sagayama |
| 2012/0152233 A1 | 6/2012 | Masuda et al. |
| 2012/0152877 A1 | 6/2012 | Tadayon |
| 2012/0186632 A1* | 7/2012 | Reinhold .............. F24J 2/4638 136/251 |
| 2012/0198682 A1 | 8/2012 | Potter et al. |
| 2012/0198779 A1 | 8/2012 | Tachino |
| 2012/0199266 A1 | 8/2012 | Potter et al. |
| 2012/0223033 A1 | 9/2012 | Molek |
| 2012/0298201 A1 | 11/2012 | Stephan |
| 2012/0318325 A1 | 12/2012 | Liu |
| 2013/0048583 A1 | 2/2013 | Kruse |
| 2013/0068275 A1 | 3/2013 | Swahn et al. |
| 2013/0084419 A1 | 4/2013 | Taylor et al. |
| 2013/0133172 A1 | 5/2013 | Kiener et al. |
| 2013/0133275 A1 | 5/2013 | Bindschedler et al. |
| 2013/0139869 A1 | 6/2013 | Nuernberger et al. |
| 2013/0180568 A1 | 7/2013 | Hartelius |
| 2013/0206206 A1 | 8/2013 | Bjorneklett et al. |
| 2013/0239343 A1 | 9/2013 | Lacalle Bayo |
| 2013/0248478 A1 | 9/2013 | Wheeler et al. |
| 2013/0255167 A1* | 10/2013 | Concho .................. E04D 13/00 52/84 |
| 2013/0263914 A1 | 10/2013 | Crimmins et al. |
| 2013/0276304 A1 | 10/2013 | Flaherty et al. |
| 2013/0305518 A1 | 11/2013 | Adriani et al. |
| 2013/0319962 A1 | 12/2013 | Park et al. |
| 2013/0340807 A1 | 12/2013 | Gerwing et al. |
| 2014/0033511 A1 | 2/2014 | Swahn et al. |
| 2014/0069483 A1 | 3/2014 | Wolter et al. |
| 2014/0083249 A1 | 3/2014 | Michotte De Welle et al. |
| 2014/0109334 A1 | 4/2014 | Saraf |
| 2014/0174315 A1 | 6/2014 | Camp et al. |
| 2014/0270990 A1* | 9/2014 | Heraty ................ E02D 29/0266 405/286 |
| 2014/0310906 A1 | 10/2014 | Zanatta |
| 2015/0069001 A1 | 3/2015 | French et al. |
| 2015/0144156 A1 | 5/2015 | French et al. |
| 2015/0200619 A1 | 7/2015 | Worden |
| 2015/0229265 A1 | 8/2015 | Miraikikai et al. |
| 2015/0316639 A1 | 11/2015 | Russ et al. |
| 2015/0330040 A1 | 11/2015 | Dobbs |
| 2016/0044843 A1 | 2/2016 | Swahn et al. |
| 2016/0365823 A1 | 12/2016 | French et al. |
| 2016/0365830 A1 | 12/2016 | Bailey et al. |

FOREIGN PATENT DOCUMENTS

| | | |
|---|---|---|
| CN | 203055930 | 7/2013 |
| DE | 202005003750 | 5/2005 |
| DE | 102009049926 | 4/2011 |
| EA | 200970984 | 6/2010 |
| EP | 2505934 | 10/2012 |
| EP | 2581687 | 4/2013 |
| FR | 2959555 | 11/2011 |
| JP | 54-23137 | 8/1979 |
| JP | 2-17200 | 2/1990 |
| JP | 07-018796 | 1/1995 |
| JP | 08-078715 | 3/1996 |
| JP | 2004-140256 | 5/2004 |
| JP | 3160565 U | 7/2010 |
| KR | 10-1034192 | 5/2011 |
| KR | 10-2011-0061166 | 6/2011 |
| PH | 1-1998-00592 | 5/2001 |
| WO | WO 2006/117551 | 11/2006 |
| WO | WO 2010/054274 | 5/2010 |
| WO | WO 2010/136468 | 12/2010 |
| WO | WO 2010/145844 | 12/2010 |
| WO | WO 2012/003585 | 1/2012 |
| WO | WO 2012/107671 | 8/2012 |
| WO | WO 2012/168070 | 12/2012 |
| WO | WO 2016/049710 | 4/2016 |

OTHER PUBLICATIONS

Chinese Patent Office, First Office Action for CN 201280023942.0, dated Mar. 20, 2015, with English language translation.

Chinese Patent Office, Second Office Action for Cn 201280023942.0, dated Feb. 14, 2016, with English translation.

Australian Patent Office, Patent Examination Report No. 1 for Application 2013263123, dated Jun. 30, 2016 (4 pages).

Chinese Patent Office, First Office Action for CN 201380035248.5, dated Oct. 20, 2015, with English Translation.

Japanese Patent Office, First Office Action for JP 2015-512704 dated Jan. 31, 2017, with English Translation.

European Patent Office, Extended European Search Report for EP 12760313.2-1605 dated Mar. 25, 2015 (6 pages).

Kazakhstan Patent Office, Official Action for Application 2014/2546.1, dated Jul. 22, 2016.

Chilean Patent Office, Official Action for Application No. 2014-003093, dated Oct. 10, 2017 (16 pages).

Patent Office of the Cooperation Counsel of the Arab States of the Gulf, Examination Report for GC 2012-22216, dated Mar. 7, 2016 (5 pages).

Chilean Patent Office, Official Action for Application No. 201600486, dated Nov. 7, 2017 (11 pages).

Patent Cooperation Treaty, International Search Report for PCT/US12/029345 dated Oct. 10, 2012 (4 pages).

Patent Cooperation Treaty, Written Opinion of the International Searching Authority for PCT/US12/029345 dated Oct. 10, 2012 (8 pages).

Patent Cooperation Treaty, International Search Report for PCT/US13/30416 dated Jun. 17, 2013 (2 pages).

Patent Cooperation Treaty, Written Opinion of the International Searching Authority for PCT/US13/30416 dated Jun. 17, 2013 (6 pages).

(56) References Cited

OTHER PUBLICATIONS

Patent Cooperation Treaty, International Search Report for PCT/US13/40500 dated Sep. 4, 2013 (2 pages).
Patent Cooperation Treaty, Written Opinion of the International Searching Authority for PCT/US13/40500 dated Sep. 4, 2013 (9 pages).
Patent Cooperation Treaty, International Search Report for PCT/US14/54916 dated Dec. 24, 2014 (2 pages).
Patent Cooperation Treaty, Written Opinion of the International Searching Authority for PCT/US14/54916 dated Dec. 24, 2014 (9 pages).
Patent Cooperation Treaty, International Search Report for PCT/US14/53787 dated Jan. 12, 2015 (2 pages).
Patent Cooperation Treaty, Written Opinion of the International Searching Authority for PCT/US14/53787 dated Jan. 12, 2015 (7 pages).
Patent Cooperation Treaty, International Search Report for PCT/US11/027700 dated May 3, 2011 (2 pages).
Patent Cooperation Treaty, Written Opinion of the International Searching Authority for PCT/US11/027700 dated May 3, 2011 (4 pages).
Patent Cooperation Treaty, International Search Report for PCT/US11/033722 dated Jul. 28, 2011 (2 pages).
Patent Cooperation Treaty, Written Opinion of the International Searching Authority for PCT/US11/033722 dated Jul. 28, 2011 (9 pages).
Patent Cooperation Treaty, International Search Report for PCT/US11/046175 dated Dec. 9, 2011 (2 pages).
Patent Cooperation Treaty, Written Opinion of the International Searching Authority for PCT/US11/046175 dated Dec. 9, 2011 (8 pages).
Patent Cooperation Treaty, International Search Report for PCT/US11/038094 dated Sep. 2, 2011 (2 pages).
Patent Cooperation Treaty, Written Opinion of the International Searching Authority for PCT/US11/038094 dated Sep. 2, 2011 (12 pages).
Patent Cooperation Treaty, International Search Report for PCT/US2016/032459 dated Sep. 8, 2016 (4 pages).
Patent Cooperation Treaty, Written Opinion of the International Searching Authority for PCT/US2016/032459 dated Sep. 8, 2016 (7 pages).
Patent Cooperation Treaty, International Search Report for PCT/US2016/032464 dated Oct. 4, 2016 (4 pages).
Patent Cooperation Treaty, Written Opinion of the International Searching Authority for PCT/US2016/032464 dated Oct. 4, 2016 (7 pages).
Patent Cooperation Treaty, International Search Report for PCT/US2016/050681 dated Dec. 15, 2016 (2 pages).
Patent Cooperation Treaty, Written Opinion of the International Searching Authority for PCT/US2016/050681 dated Dec. 15, 2016 (6 pages).
Patent Cooperation Treaty, International Search Report for PCT/US2016/062848 dated Feb. 16, 2017 (3 pages).
Patent Cooperation Treaty, Written Opinion of the International Searching Authority for PCT/US2016/062848 dated Feb. 16, 2017 (5 pages).
Patent Cooperation Treaty, International Search Report for PCT/US2017/040884 dated Nov. 6, 2017 (4 pages).
Patent Cooperation Treaty, Written Opinion of the International Searching Authority for PCT/US2017/040884 dated Nov. 6, 2017 (10 pages).
Patent Cooperation Treaty, International Search Report for PCT/US2017/032643 dated Sep. 15, 2017 (4 pages).
Patent Cooperation Treaty, Written Opinion of the International Searching Authority for PCT/US2017/032643 dated Sep. 15, 2017 (8 pages).
Patent Cooperation Treaty, International Search Report for PCT/US2017/040861 dated Oct. 31, 2017 (4 pages).
Patent Cooperation Treaty, Written Opinion of the International Searching Authority for PCT/US2017/040861 dated Oct. 31, 2017 (7 pages).
Patent Cooperation Treaty, International Search Report for PCT/US2017/040872 dated Sep. 8, 2017 (3 pages).
Patent Cooperation Treaty, Written Opinion of the International Searching Authority for PCT/US2017/040872 dated Sep. 8, 2017 (6 pages).
United States Patent and Trademark Office, Office Action dated Jun. 9, 2017 for U.S. Appl. No. 14/476,458 (9 pages).
United States Patent and Trademark Office, Office Action dated Feb. 15, 2017 for U.S. Appl. No. 15/085,864 (13 pages).
United States Patent and Trademark Office, Final Office Action dated Jul. 6, 2017 for U.S. Appl. No. 15/085,864 (15 pages).
United States Patent and Trademark Office, Office Action dated May 11, 2017 for U.S. Appl. No. 15/244,864 (7 pages).
United States Patent and Trademark Office, Notice of Allowance dated Dec. 7, 2017 for U.S. Appl. No. 15/244,864 (5 pages).
Array Technologies, Inc., Technical Datasheet for DuraTrack® HZ v3 (2 pages).
Cardwell, "A Staff of Robots Can Clean and Install Solar Panels," New York Times, Oct. 14, 2013 (4 pages).
Exosun Inc., Technical Datasheet for exotrack® HZ v.2 (4 pages).
Ideematec Deutschland GmbH, Product literature for safeTrack Horizon (6 pages).
Lovejoy, Inc., "Lovejoy Coupling Solutions" catalog of discs (28 pages).
Lovejoy, Inc., Technical Datasheet for Lovejoy 4 Bolt Disc Coupling (2 pages).
Matt. "Fracking Ramp: An Essential Tool in Oil Field Services Fracking Boom"; Hand-Ramp; Website [online]. May 28, 2013 [retrieved Nov. 3, 2016]. Retrieved from the Internet: <URL: https://handiramp.com/blog/categoty/material-handling/page/2/>.
5B, Product literature for Maverick (3 pages).
NEXTracker, Inc., Product literature for Self-Powered Tracking with NEXTrackerSPT (3 pages).
Optimum Tracker, Technical Datasheet for O-Track HZ (4 pages).
R+W America, Technical Datasheet for Ecolight® Elastomer Couplings (4 pages).
YouTube, "Soluzioni per lavaggio e pulizia fotovoltaico / Solar panel cleaning solutions / Lavaggio pannelli," 3:22 minute video uploaded to *YouTube* by Wash Panel, published on May 3, 2013, https://www.youtube.com/watch?v=b6duSZH1C9o, 7 pages (screen shots obtained on Aug. 11, 2016).

\* cited by examiner

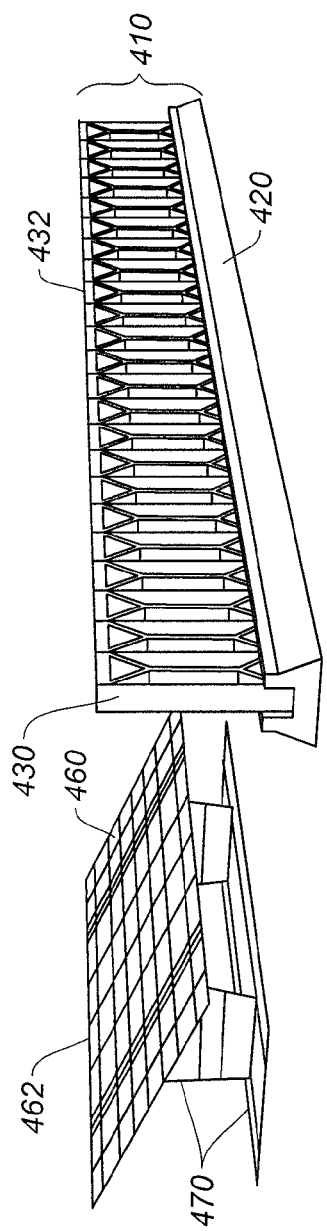
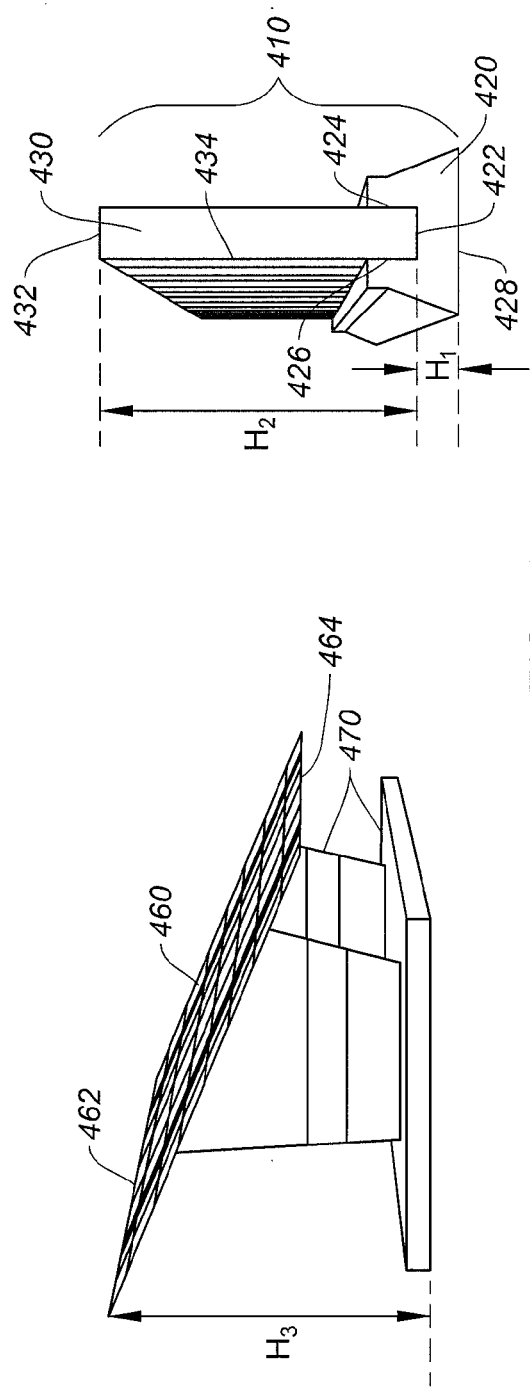
FIG. 5A
FIG. 5B

WIND SCREENS FOR PHOTOVOLTAIC ARRAYS AND METHODS THEREOF

1. CROSS-REFERENCES TO RELATED APPLICATIONS

This application claims priority to U.S. Provisional No. 62/217,322, filed Sep. 11, 2015, incorporated by reference herein for all purposes.

2. BACKGROUND OF THE INVENTION

Certain embodiments of the present invention are directed to wind screens. More particularly, some embodiments of the invention provide wind screens for photovoltaic arrays and methods thereof. Merely by way of example, some embodiments of the invention have been applied to ground-mounted photovoltaic arrays. But it would be recognized that the invention has a much broader range of applicability.

Photovoltaics convert sunlight into electricity, providing a desirable source of clean energy. A conventional photovoltaic array often includes one or more strings, and each string usually includes one or more photovoltaic modules (e.g., one or more solar panels) that are connected in series. The photovoltaic array, for example, is connected to a central inverter, which provides an alternating current (AC) connection to a power grid. After one or more photovoltaic arrays are installed, one or more photovoltaic modules (e.g., one or more solar panels) may be damaged by strong wind.

Hence, it is highly desirable to improve techniques for operation of one or more photovoltaic arrays in windy environment.

3. BRIEF SUMMARY OF THE INVENTION

Certain embodiments of the present invention are directed to wind screens. More particularly, some embodiments of the invention provide wind screens for photovoltaic arrays and methods thereof. Merely by way of example, some embodiments of the invention have been applied to ground-mounted photovoltaic arrays. But it would be recognized that the invention has a much broader range of applicability.

According to one embodiment, a wind screen for one or more photovoltaic arrays includes a screen foundation including a concrete block, and one or more perforation blocks on the concrete block. For example, the wind screen is configured to cover at least a first side of each array of the one or more photovoltaic arrays.

According to another embodiment, a wind screen for one or more photovoltaic arrays includes a screen foundation including a concrete block, and one or more perforation blocks on the concrete block. For example, the wind screen is configured to cover at least one corner of each array of the one or more photovoltaic arrays.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 5A and FIG. 5B are simplified diagrams showing a section of wind screen that covers one or more photovoltaic modules according to one embodiment of the present invention.

Figure 6A:
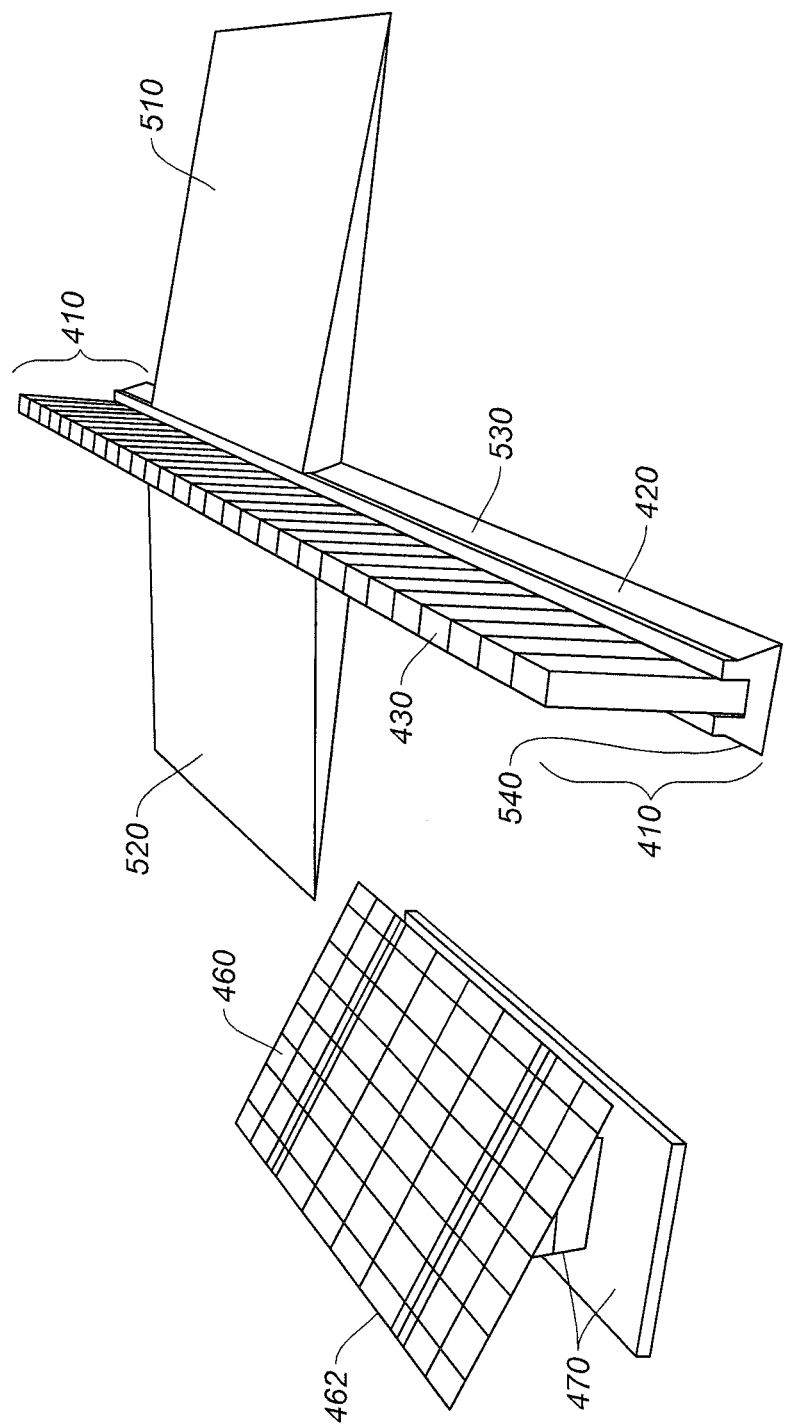
Figure 6B:
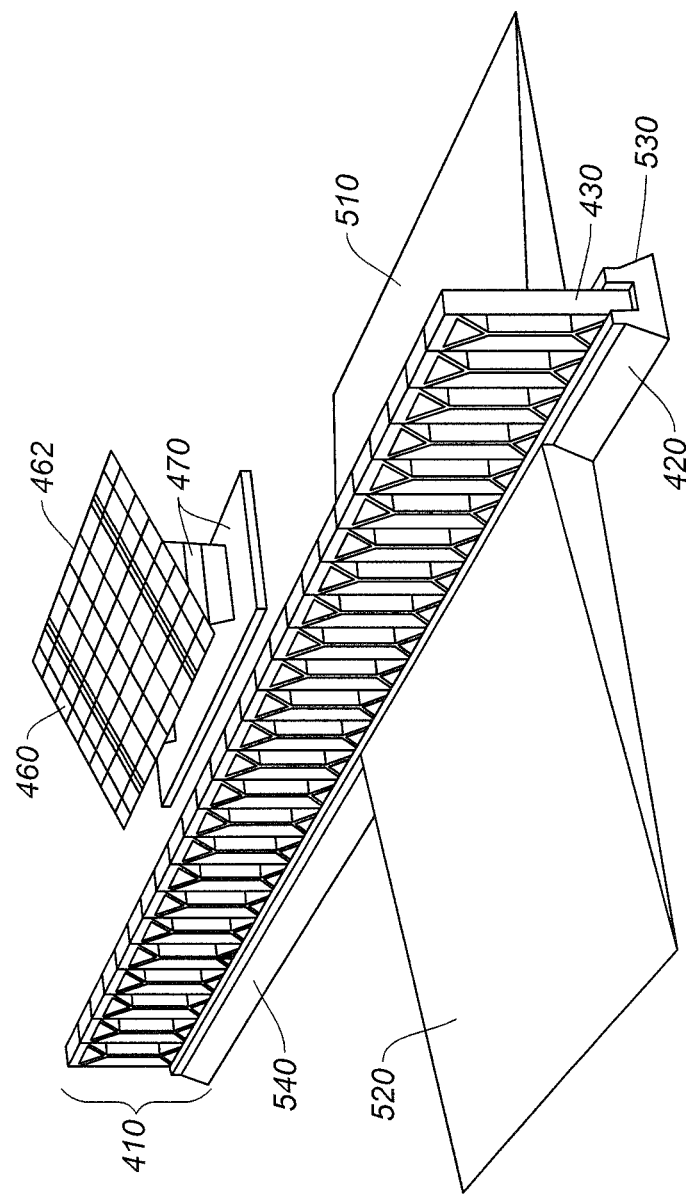
Figure 6C:
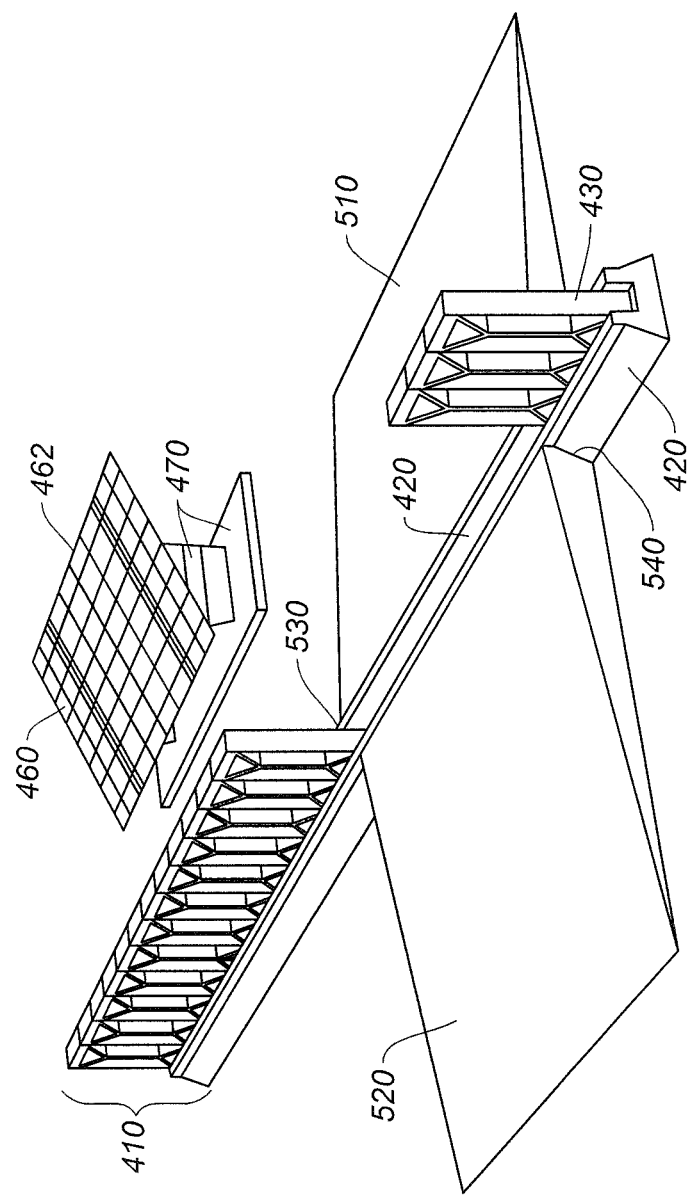

FIG. 6A, FIG. 6B, and FIG. 6C are simplified diagrams showing one or more vehicle access ramps for a section of wind screen that covers one or more photovoltaic modules according to one embodiment of the present invention.

Figure 7:
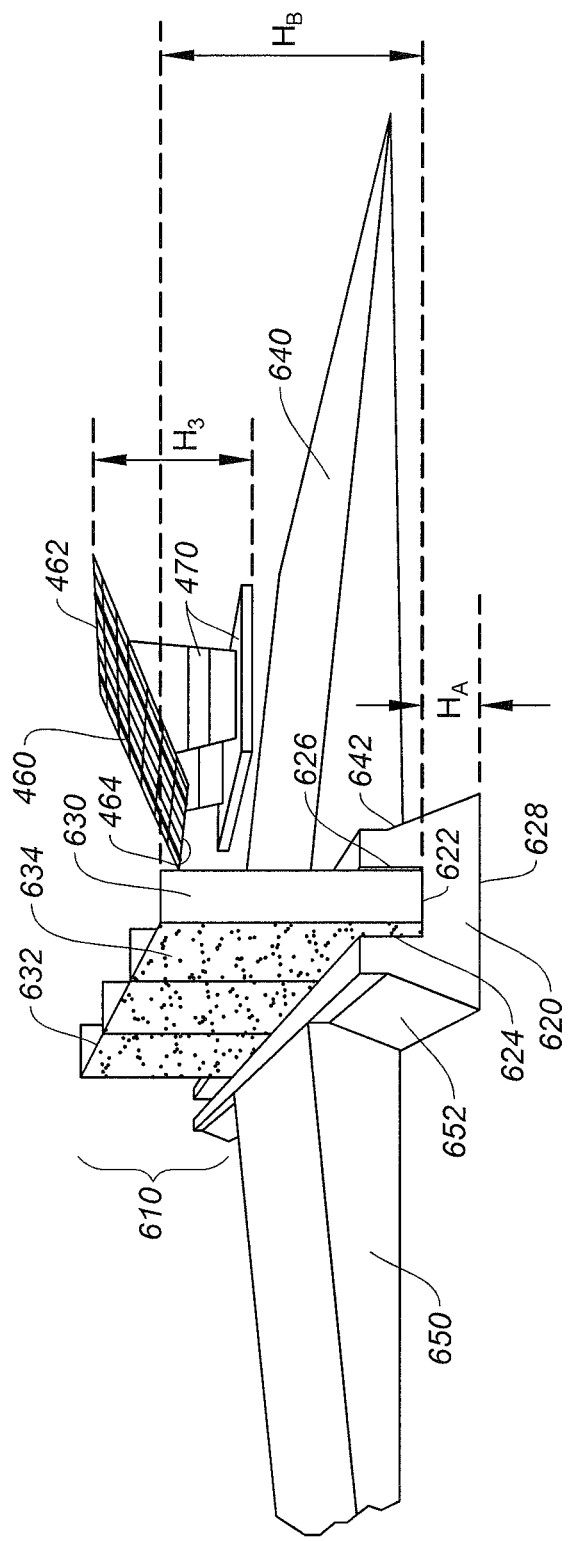

FIG. 7 is a simplified diagram showing a section of wind screen that covers one or more photovoltaic modules and one or more vehicle access ramps for the section of wind screen according to another embodiment of the present invention.

Figure 8:
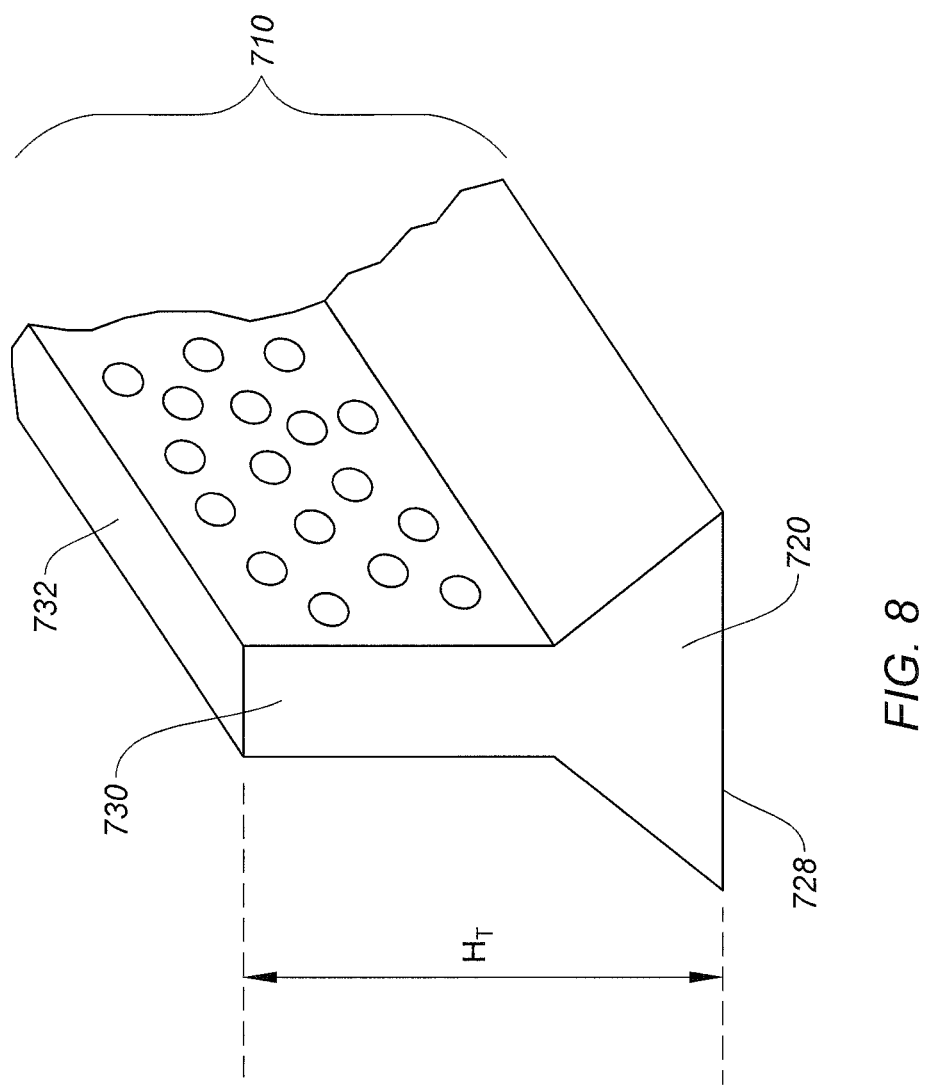

FIG. 8 is a simplified diagram showing a section of wind screen that includes a unitary concrete profile covering one or more photovoltaic modules according to another embodiment of the present invention.

Figure 2A:
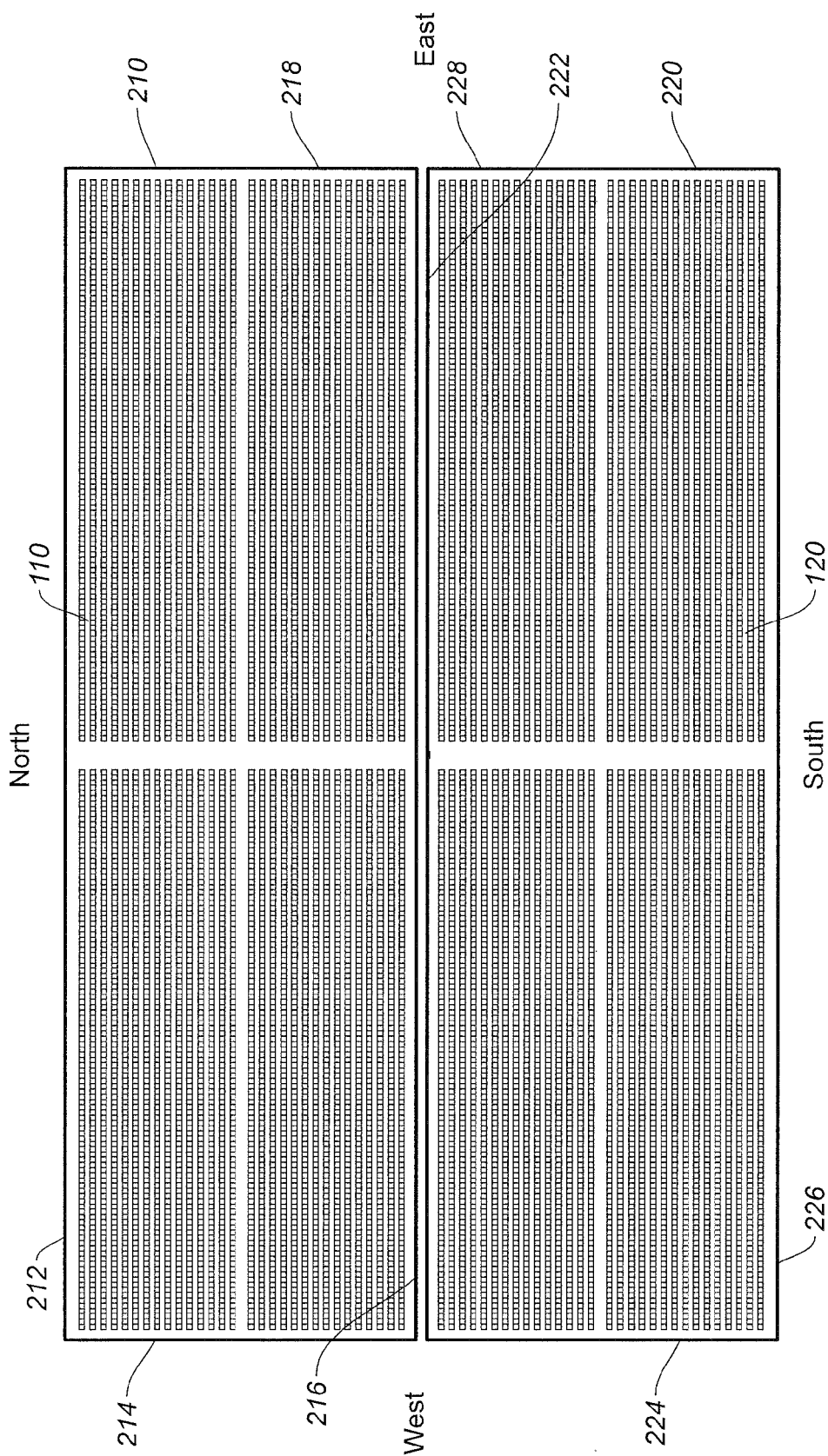
FIG. 2A is a simplified diagram showing one or more enclosing wind screens for one or more photovoltaic arrays according to yet another embodiment of the present invention.
Figure 2B:
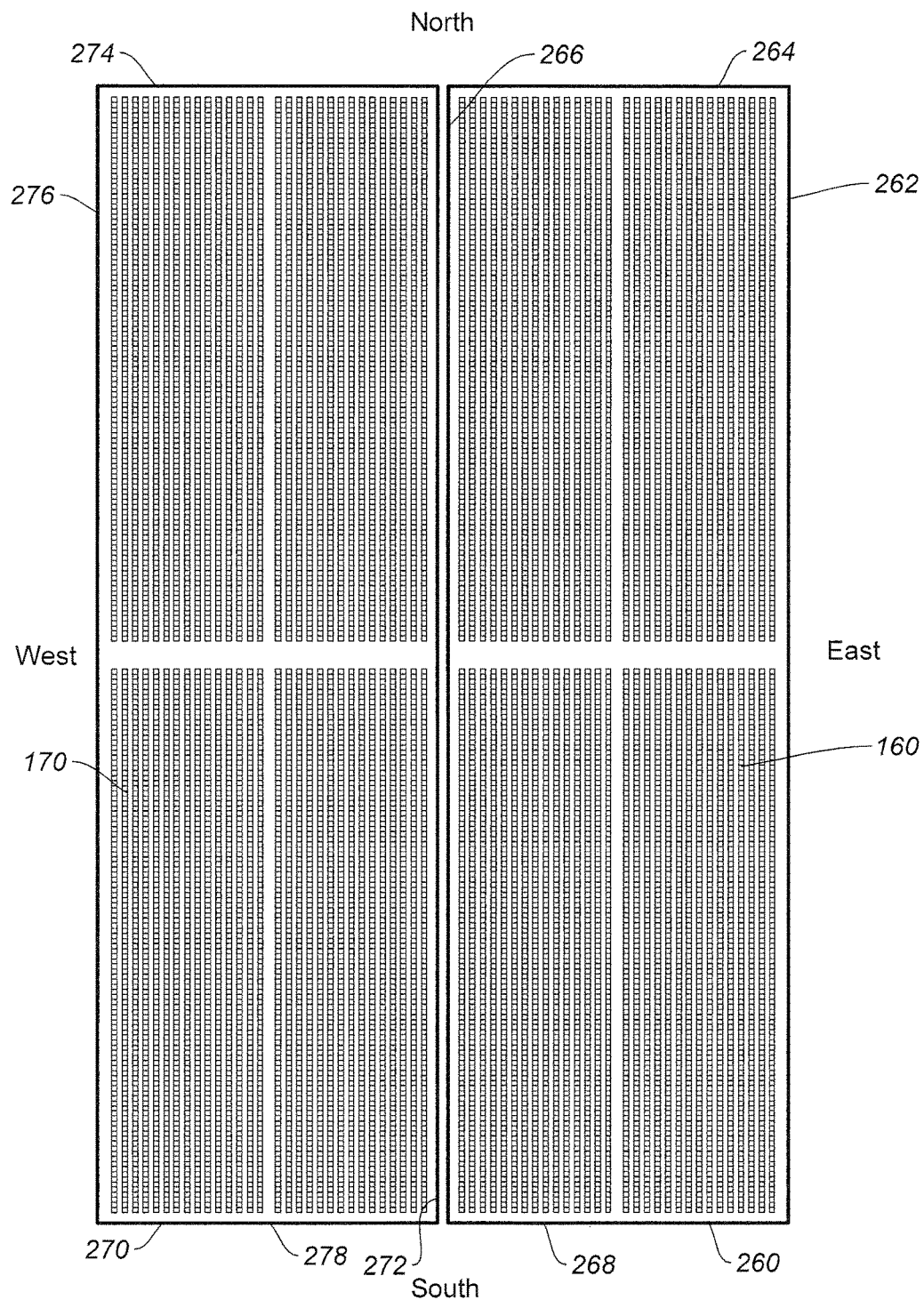
FIG. 2B is a simplified diagram showing one or more enclosing wind screens for one or more photovoltaic arrays according to yet another embodiment of the present invention.
Figure 3A:
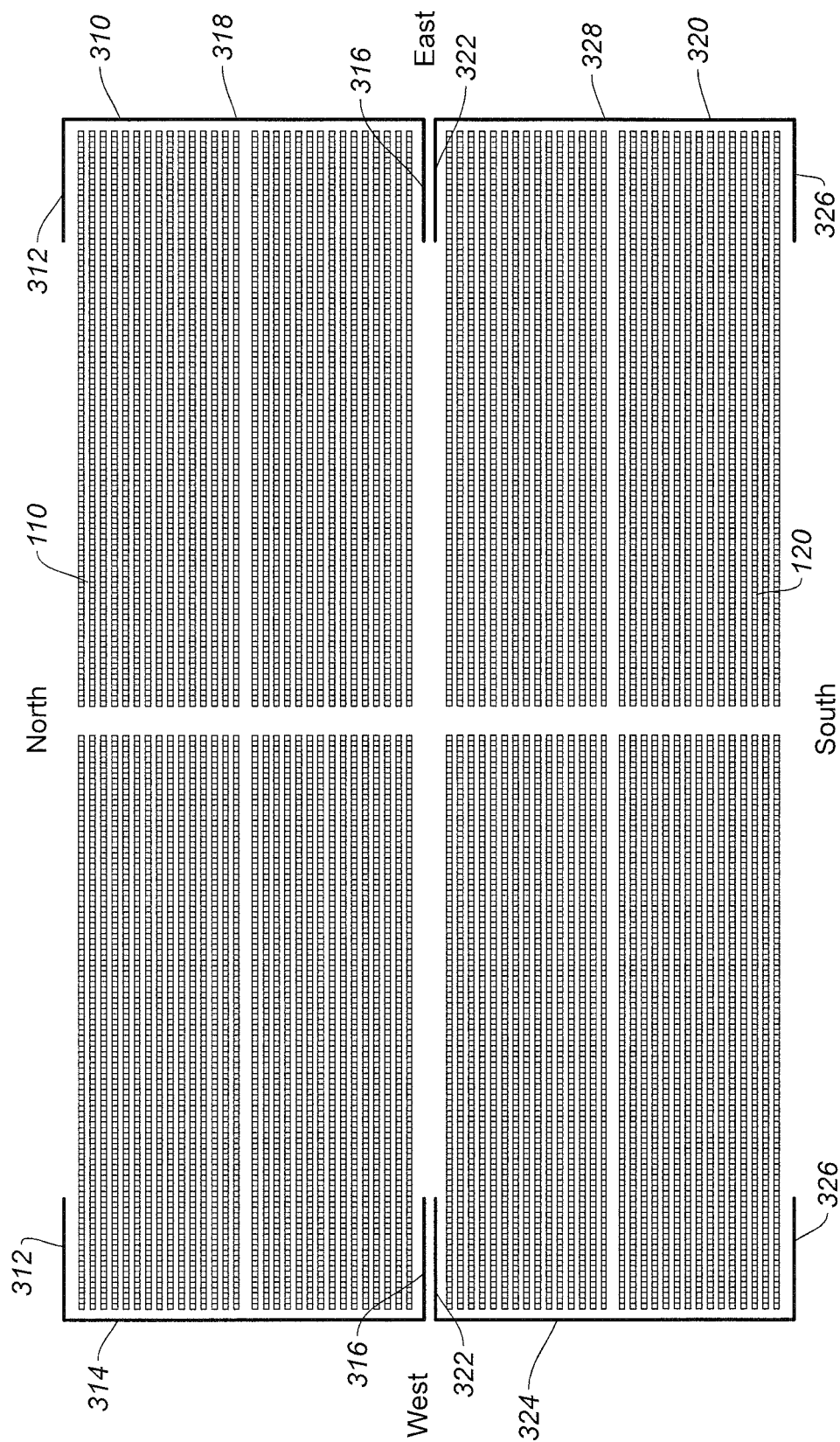
FIG. 3A is a simplified diagram showing each of one or more wind screens covering at least two sides and four corners of one photovoltaic array according to yet another embodiment of the present invention.
Figure 3B:
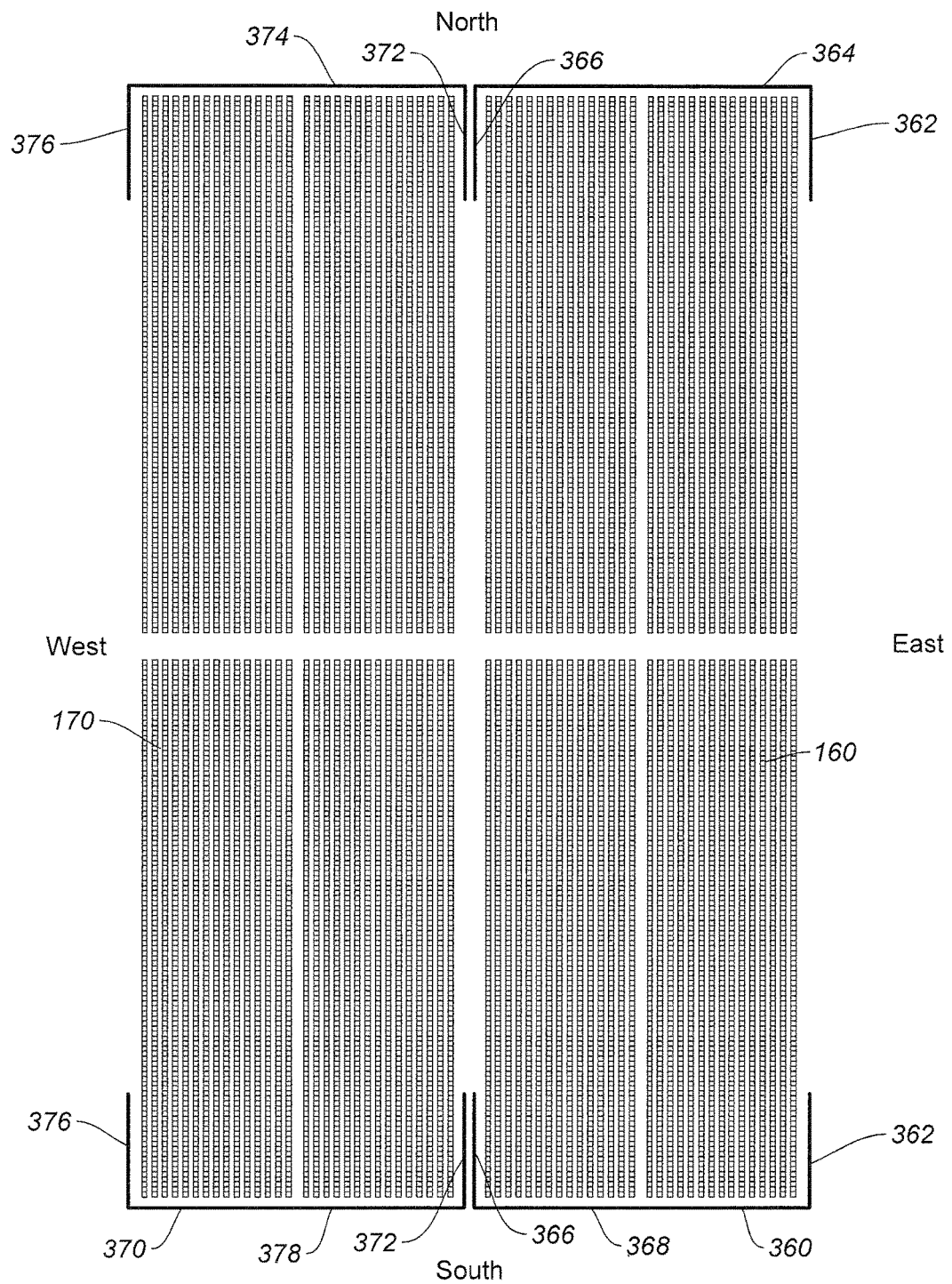
FIG. 3B is a simplified diagram showing each of one or more wind screens covering at least two sides and four corners of one photovoltaic array according to yet another embodiment of the present invention.
Figure 4A:
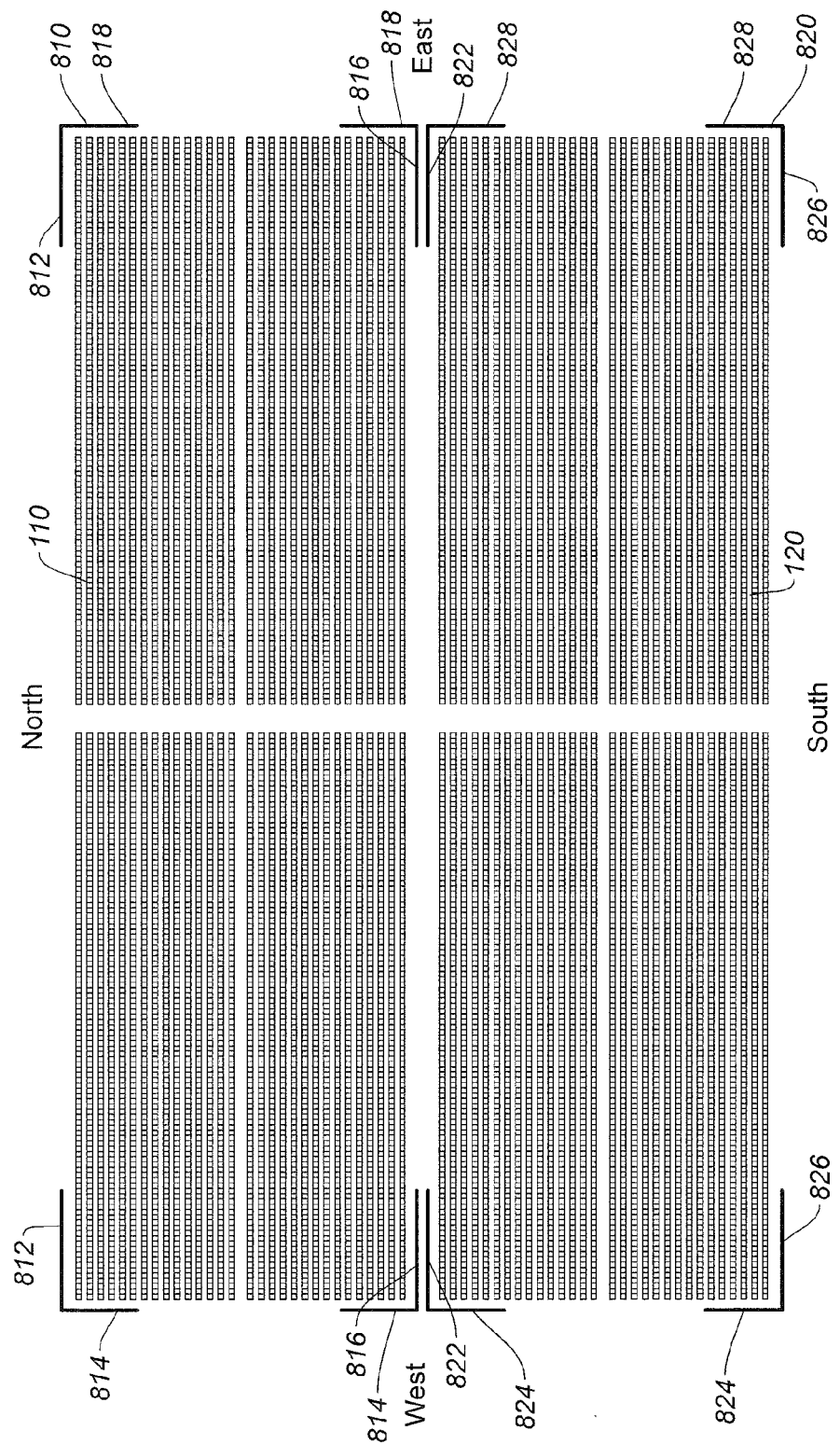
FIG. 4A is a simplified diagram showing each of one or more wind screens covering at least four corners of one photovoltaic array according to yet another embodiment of the present invention.
Figure 4B:
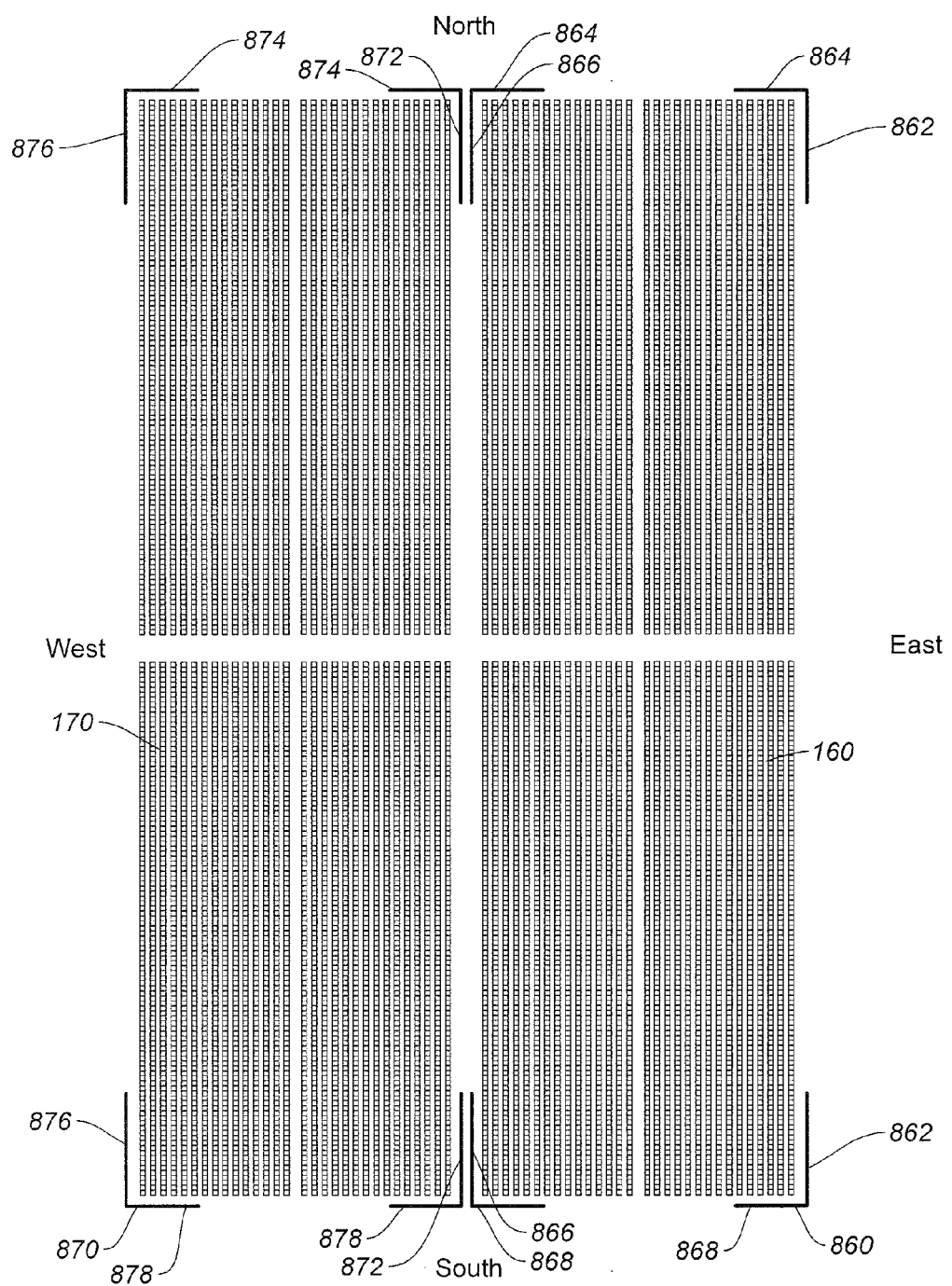
FIG. 4B is a simplified diagram showing each of one or more wind screens covering at least four corners of one photovoltaic array according to yet another embodiment of the present invention.
Figure 9:
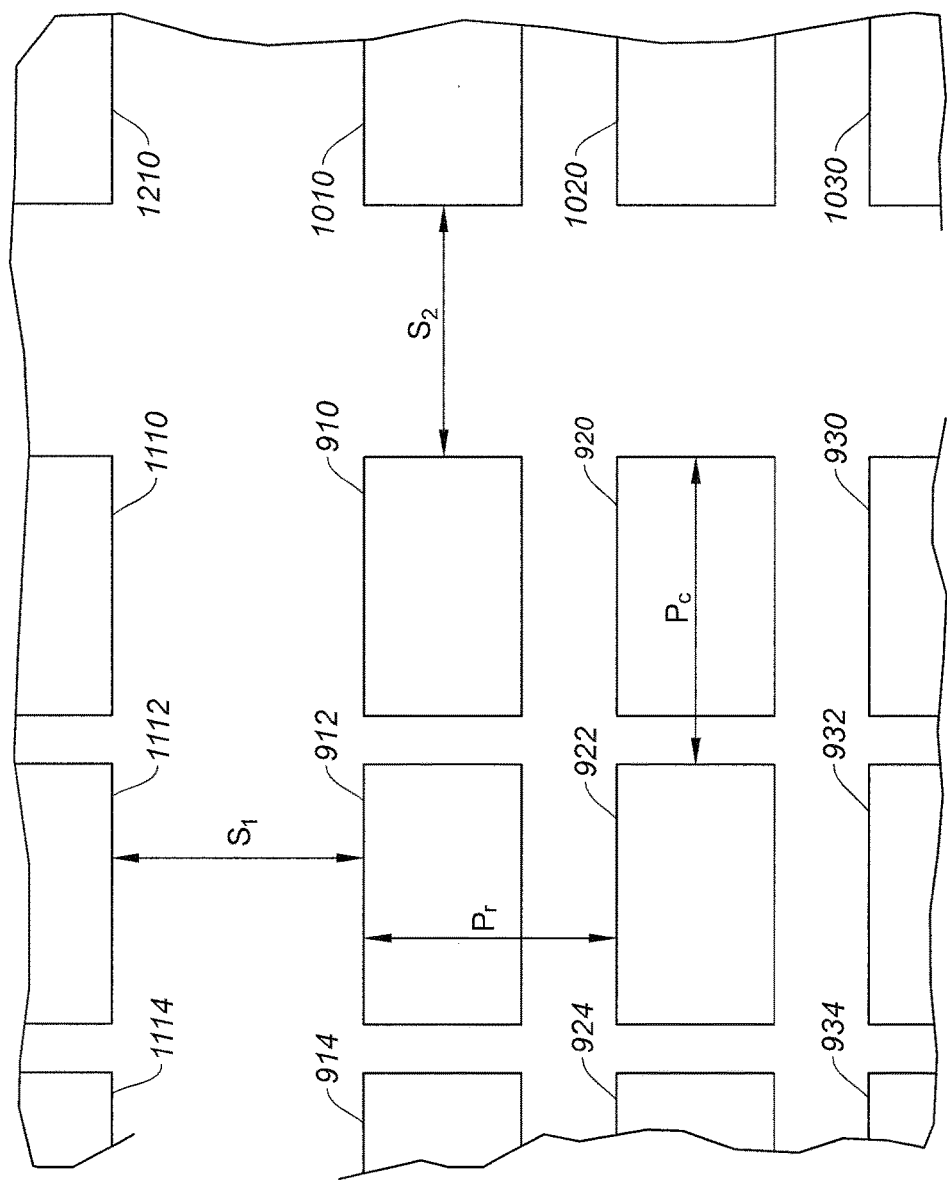

FIG. 9 is a simplified diagram showing one or more parts of a photovoltaic array that is at least partially covered by one or more wind screens as shown in FIG. 1A, FIG. 1B, FIG. 2A, FIG. 2B, FIG. 3A, FIG. 3B, FIG. 4A, and/or FIG. 4B according to certain embodiments of the present invention.

5. DETAILED DESCRIPTION OF THE INVENTION

Certain embodiments of the present invention are directed to wind screens. More particularly, some embodiments of the invention provide wind screens for photovoltaic arrays and methods thereof. Merely by way of example, some embodiments of the invention have been applied to ground-mounted photovoltaic arrays. But it would be recognized that the invention has a much broader range of applicability.

Figure 1A:
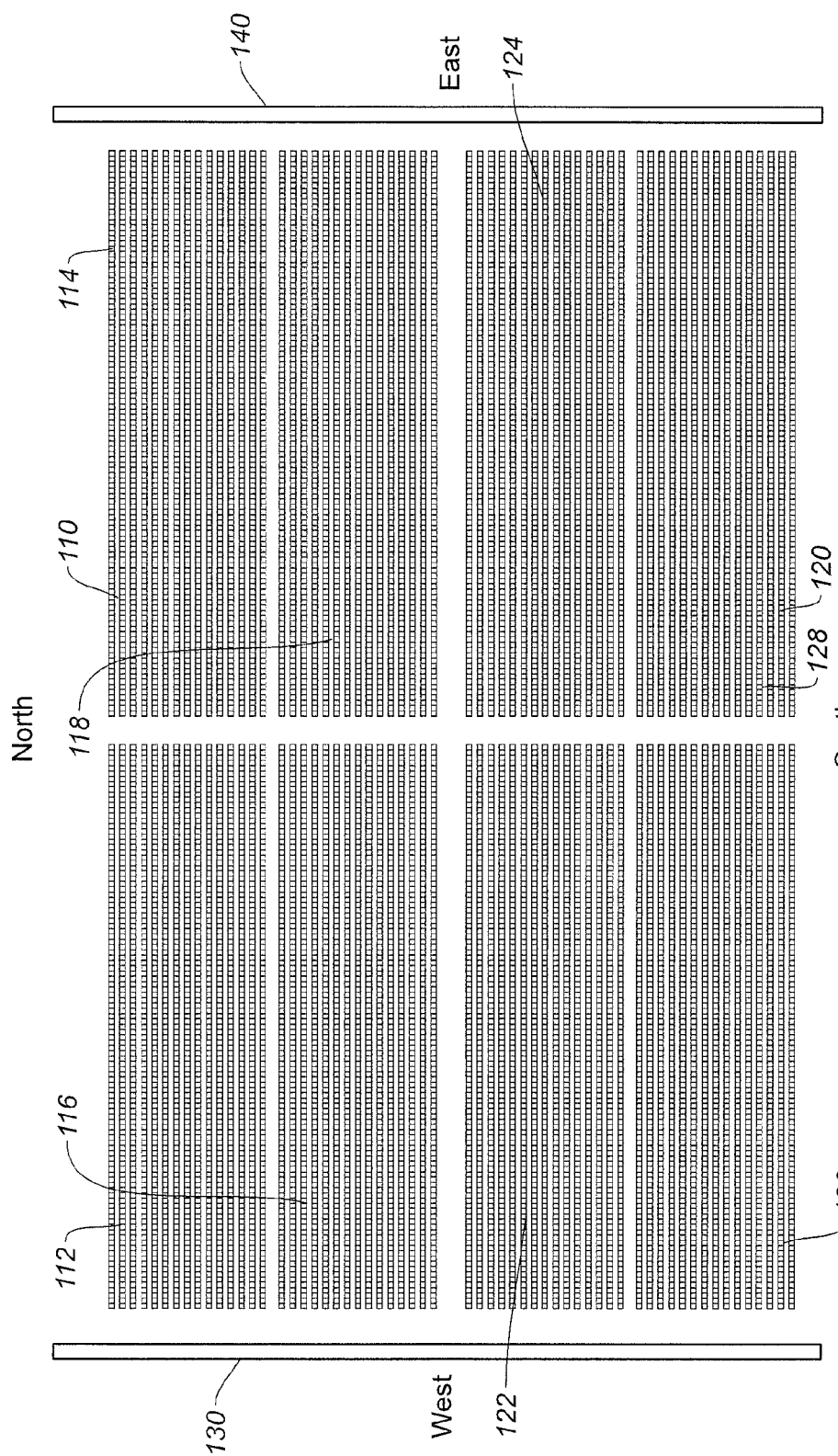
FIG. 1A is a simplified diagram showing one or more wind screens for one or more photovoltaic arrays according to one embodiment of the present invention.

FIG. 1A is a simplified diagram showing one or more wind screens for one or more photovoltaic arrays according to one embodiment of the present invention. This diagram is merely an example, which should not unduly limit the scope of the claims. One of ordinary skill in the art would recognize many variations, alternatives, and modifications.

In FIG. 1A, photovoltaic arrays 110 and 120 are partially surrounded by edge wind screens 130 and 140.

According to one embodiment, the photovoltaic array 110 includes array blocks 112, 114, 116, and 118. For example, each of the array blocks 112, 114, 116, and 118 includes multiple photovoltaic modules (e.g., multiple solar panels). In another example, the multiple photovoltaic modules (e.g., multiple solar panels) are organized in rows and columns. In yet another example, within the same array block (e.g., the array block 112, 114, 116, or 118), the row pitch for two adjacent rows of photovoltaic modules is constant or approximately constant across the entire array block. In yet another example, the row pitch for one array block of the array blocks 112, 114, 116, and 118 is equal to or approximately equal to the row pitch for another array block of the array blocks 112, 114, 116, and 118. In yet another example, within the same array block (e.g., the array block 112, 114, 116, or 118), the column pitch for two adjacent columns of photovoltaic modules is constant or approximately constant across the entire array block. In yet another example, the column pitch for one array block of the array blocks 112, 114, 116, and 118 is equal to or approximately equal to the column pitch for another array block of the array blocks 112, 114, 116, and 118.

According to another embodiment, the photovoltaic array 120 includes array blocks 122, 124, 126, and 128. For example, each of the array blocks 122, 124, 126, and 128 includes multiple photovoltaic modules (e.g., multiple solar panels). In another example, the multiple photovoltaic modules (e.g., multiple solar panels) are organized in rows and columns. In yet another example, within the same array block (e.g., the array block 122, 124, 126, or 128), the row pitch for two adjacent rows of photovoltaic modules is constant or approximately constant across the entire array block. In yet another example, the row pitch for one array block of the array blocks 122, 124, 126, and 128 is equal to or approximately equal to the row pitch for another array block of the array blocks 122, 124, 126, and 128. In yet another example, within the same array block (e.g., the array block 122, 124, 126, or 128), the column pitch for two adjacent columns of photovoltaic modules is constant or approximately constant across the entire array block. In yet another example, the column pitch for one array block of the array blocks 122, 124, 126, and 128 is equal to or approximately equal to the column pitch for another array block of the array blocks 122, 124, 126, and 128.

In one embodiment, the edge wind screen 130 is located on the west side of the photovoltaic arrays 110 and 120, covering the west edge of the photovoltaic array 110 and the west edge of the photovoltaic array 120. For example, the west edge of the photovoltaic array 110 includes the west edges of the array blocks 112 and 116. In another example, the west edge of the photovoltaic array 120 includes the west edges of the array blocks 122 and 126. In another embodiment, the edge wind screen 140 is located on the east side of the photovoltaic arrays 110 and 120, covering the east edge of the photovoltaic array 110 and the east edge of the photovoltaic array 120. For example, the east edge of the photovoltaic array 110 includes the east edges of the array blocks 114 and 118. In another example, the east edge of the photovoltaic array 120 includes the east edges of the array blocks 124 and 128.

According to certain embodiments, the edge wind screens 130 and 140 are implemented according to at least FIG. 5A, FIG. 5B, FIG. 6A, FIG. 6B, FIG. 6C, FIG. 7, and/or FIG. 8.

As discussed above and further emphasized here, FIG. 1A is merely an example, which should not unduly limit the scope of the claims. One of ordinary skill in the art would recognize many variations, alternatives, and modifications. In one embodiment, the edge wind screen 130 is located on the north side of the photovoltaic arrays 110 and 120 to cover the north edge of the photovoltaic array 110, and the edge wind screen 140 is located on the south side of the photovoltaic arrays 110 and 120 to cover the south edge of the photovoltaic array 120. In another embodiment, the edge wind screen 130 is located on the west side of the photovoltaic arrays 110 and 120 to cover the west edge of the photovoltaic array 110 and the west edge of the photovoltaic array 120, and the edge wind screen 140 is located on the north side of the photovoltaic array 110 or on the south side of the photovoltaic array 120. In yet another embodiment, the edge wind screen 140 is located on the east side of the photovoltaic arrays 110 and 120 to cover the east edge of the photovoltaic array 110 and the east edge of the photovoltaic array 120, and the edge wind screen 130 is located on the north side of the photovoltaic array 110 or on the south side of the photovoltaic array 120. According to another embodiment, either the edge wind screen 130 or the edge wind screen 140 is removed. According to yet another embodiment, an additional edge wind screen is added on an additional side of the photovoltaic array 110 and/or the photovoltaic array 120, and neither the edge wind screen 130 nor the edge wind screen 140 is located on this additional side. According to yet another embodiment, two additional edge wind screens are added on two additional sides of the photovoltaic array 110 and/or the photovoltaic array 120 respectively, and neither the edge wind screen 130 nor the edge wind screen 140 is located on either of these two additional sides. For example, the combination of the photovoltaic arrays 110 and 120 are completely surrounded by four edge wind screens.

Figure 1B:
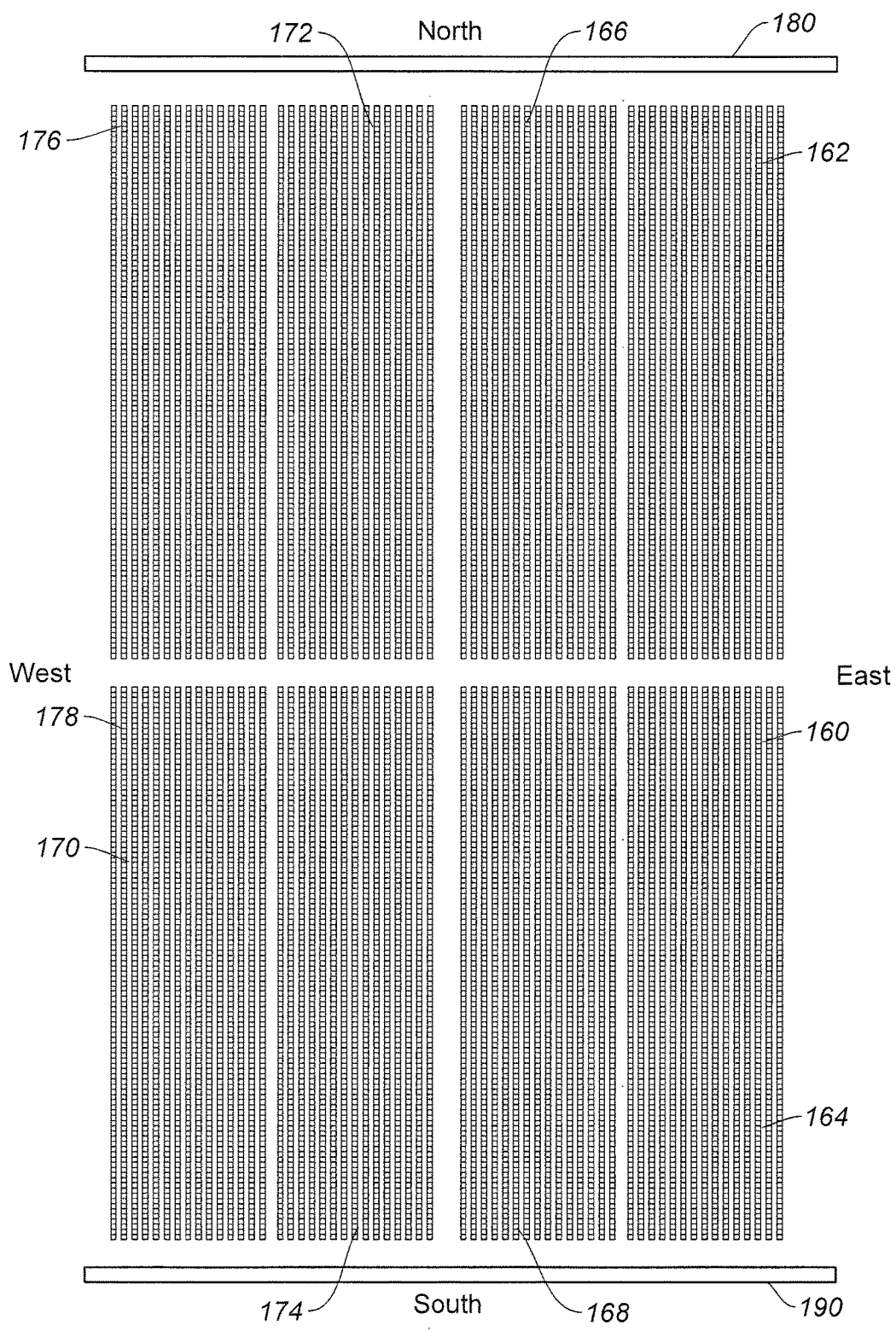
FIG. 1B is a simplified diagram showing one or more wind screens for one or more photovoltaic arrays according to another embodiment of the present invention.

FIG. 1B is a simplified diagram showing one or more wind screens for one or more photovoltaic arrays according to another embodiment of the present invention. This diagram is merely an example, which should not unduly limit the scope of the claims. One of ordinary skill in the art would recognize many variations, alternatives, and modifications. In FIG. 1B, photovoltaic arrays 160 and 170 are partially surrounded by edge wind screens 180 and 190.

According to one embodiment, the photovoltaic array 160 includes array blocks 162, 164, 166, and 168. For example, each of the array blocks 162, 164, 166, and 168 includes multiple photovoltaic modules (e.g., multiple solar panels). In another example, the multiple photovoltaic modules (e.g., multiple solar panels) are organized in rows and columns. In yet another example, within the same array block (e.g., the array block 162, 164, 166, or 168), the row pitch for two adjacent rows of photovoltaic modules is constant or approximately constant across the entire array block. In yet another example, the row pitch for one array block of the array blocks 162, 164, 166, and 168 is equal to or approximately equal to the row pitch for another array block of the array blocks 162, 164, 166, and 168. In yet another example, within the same array block (e.g., the array block 162, 164, 166, or 168), the column pitch for two adjacent columns of photovoltaic modules is constant or approximately constant across the entire array block. In yet another example, the column pitch for one array block of the array blocks 162, 164, 166, and 168 is equal to or approximately equal to the column pitch for another array block of the array blocks 162, 164, 166, and 168.

According to another embodiment, the photovoltaic array 170 includes array blocks 172, 174, 176, and 178. For example, each of the array blocks 172, 174, 176, and 178 includes multiple photovoltaic modules (e.g., multiple solar panels). In another example, the multiple photovoltaic modules (e.g., multiple solar panels) are organized in rows and columns. In yet another example, within the same array block (e.g., the array block 172, 174, 176, or 178), the row pitch for two adjacent rows of photovoltaic modules is constant or approximately constant across the entire array block. In yet another example, the row pitch for one array block of the array blocks 172, 174, 176, and 178 is equal to or approximately equal to the row pitch for another array block of the array blocks 172, 174, 176, and 178. In yet another example, within the same array block (e.g., the array block 172, 174, 176, or 178), the column pitch for two adjacent columns of photovoltaic modules is constant or approximately constant across the entire array block. In yet another example, the column pitch for one array block of the array blocks 172, 174, 176, and 178 is equal to or approximately equal to the column pitch for another array block of the array blocks 172, 174, 176, and 178.

In one embodiment, the edge wind screen 180 is located on the north side of the photovoltaic arrays 160 and 170, covering the north edge of the photovoltaic array 160 and the north edge of the photovoltaic array 170. For example, the north edge of the photovoltaic array 160 includes the north edges of the array blocks 162 and 166. In another example, the north edge of the photovoltaic array 170 includes the north edges of the array block 172 and 176. In another embodiment, the edge wind screen 190 is located on the south side of the photovoltaic arrays 160 and 170, covering the south edge of the photovoltaic array 160 and the south edge of the photovoltaic array 170. For example, the south edge of the photovoltaic array 160 includes the south edges of the array blocks 164 and 168. In another example, the south edge of the photovoltaic array 170 includes the south edges of the array blocks 174 and 178.

According to certain embodiments, the edge wind screens 180 and 190 are implemented according to at least FIG. 5A, FIG. 5B, FIG. 6A, FIG. 6B, FIG. 6C, FIG. 7, and/or FIG. 8.

As discussed above and further emphasized here, FIG. 1B is merely an example, which should not unduly limit the scope of the claims. One of ordinary skill in the art would recognize many variations, alternatives, and modifications. In one embodiment, the edge wind screen 180 is located on the east side of the photovoltaic arrays 160 and 170 to cover the east edge of the photovoltaic array 160, and the edge wind screen 190 is located on the west side of the photovoltaic arrays 160 and 170 to cover the west edge of the photovoltaic array 170. In another embodiment, the edge wind screen 180 is located on the north side of the photovoltaic arrays 160 and 170 to cover the north edge of the photovoltaic array 160 and the north edge of the photovoltaic array 170, and the edge wind screen 190 is located on the east side of the photovoltaic array 160 or on the west side of the photovoltaic array 170. In yet another embodiment, the edge wind screen 190 is located on the south side of the photovoltaic arrays 160 and 170 to cover the south edge of the photovoltaic array 160 and the south edge of the photovoltaic array 170, and the edge wind screen 180 is located on the east side of the photovoltaic array 160 or on the west side of the photovoltaic array 170.

According to another embodiment, either the edge wind screen 180 or the edge wind screen 190 is removed. According to yet another embodiment, an additional edge wind screen is added on an additional side of the photovoltaic array 160 and/or the photovoltaic array 170, and neither the edge wind screen 180 nor the edge wind screen 190 is located on this additional side. According to yet another embodiment, two additional edge wind screens are added on two additional sides of the photovoltaic array 160 and/or the photovoltaic array 170 respectively, and neither the edge wind screen 180 nor the edge wind screen 190 is located on either of these two additional sides. For example, the combination of the photovoltaic arrays 160 and 170 are completely surrounded by four edge wind screens.

FIG. 2A is a simplified diagram showing one or more enclosing wind screens for one or more photovoltaic arrays according to yet another embodiment of the present invention. This diagram is merely an example, which should not unduly limit the scope of the claims. One of ordinary skill in the art would recognize many variations, alternatives, and modifications. In FIG. 2A, the photovoltaic array 110 is completely surrounded by an enclosing wind screen 210, and the photovoltaic array 120 is completely surrounded by an enclosing wind screen 220. For example, the enclosing wind screen 210 includes edge wind screens 212, 214, 216, and 218. In another example, the enclosing wind screen 220 includes edge wind screens 222, 224, 226, and 228. In yet another example, the enclosing wind screens 210 and 220 are implemented according to at least FIG. 5A, FIG. 5B, FIG. 6A, FIG. 6B, FIG. 6C, FIG. 7, and/or FIG. 8.

As discussed above and further emphasized here, FIG. 2A is merely an example, which should not unduly limit the scope of the claims. One of ordinary skill in the art would recognize many variations, alternatives, and modifications. In one embodiment, part of the enclosing wind screen 210 is removed, so that the photovoltaic array 110 is only partially surrounded by the wind screen 210. For example, one or more parts of the edge wind screen 212, the edge wind screen 214, the edge wind screen 216, and/or the edge wind screen 218 are removed. In another embodiment, part of the enclosing wind screen 220 is removed, so that the photovoltaic array 120 is only partially surrounded by the wind screen 220. For example, one or more parts of the edge wind screen 222, the edge wind screen 224, the edge wind screen 226, and/or the edge wind screen 228 are removed.

FIG. 2B is a simplified diagram showing one or more enclosing wind screens for one or more photovoltaic arrays according to yet another embodiment of the present invention. This diagram is merely an example, which should not unduly limit the scope of the claims. One of ordinary skill in the art would recognize many variations, alternatives, and modifications. In FIG. 2B, the photovoltaic array 160 is completely surrounded by an enclosing wind screen 260, and the photovoltaic array 170 is completely surrounded by an enclosing wind screen 270. For example, the enclosing wind screen 260 includes edge wind screens 262, 264, 266, and 268. In another example, the enclosing wind screen 270 includes edge wind screens 272, 274, 276, and 278. In yet another example, the enclosing wind screens 260 and 270 are implemented according to at least FIG. 5A, FIG. 5B, FIG. 6A, FIG. 6B, FIG. 6C, FIG. 7, and/or FIG. 8.

As discussed above and further emphasized here, FIG. 2B is merely an example, which should not unduly limit the scope of the claims. One of ordinary skill in the art would recognize many variations, alternatives, and modifications. In one embodiment, part of the enclosing wind screen 260 is removed, so that the photovoltaic array 160 is only partially surrounded by the wind screen 260. For example, one or more parts of the edge wind screen 262, the edge wind screen 264, the edge wind screen 266, and/or the edge wind screen 268 are removed. In another embodiment, part of the enclosing wind screen 270 is removed, so that the photovoltaic array 170 is only partially surrounded by the wind screen 270. For example, one or more parts of the edge wind screen 272, the edge wind screen 274, the edge wind screen 276, and/or the edge wind screen 278 are removed.

FIG. 3A is a simplified diagram showing each of one or more wind screens covering at least two sides and four corners of one photovoltaic array according to yet another embodiment of the present invention. This diagram is merely an example, which should not unduly limit the scope of the claims. One of ordinary skill in the art would recognize many variations, alternatives, and modifications.

As shown in FIG. 3A, the photovoltaic array 110 is partially surrounded by a wind screen 310. In one embodiment, the wind screen 310 covers the entire west edge of the photovoltaic array 110, the entire east edge of the photovoltaic array 110, the four corners of the photovoltaic array 110, parts of the north edge of the photovoltaic array 110, and parts of the south edge of the photovoltaic array 110. In another embodiment, the wind screen 310 includes edge screens 312, 314, 316, and 318. For example, the edge screens 314 and 318 covers the west edge of the photovoltaic array 110 and the east edge of the photovoltaic array 110 respectively. In another example, the edge screen 312 covers only parts of the north edge of the photovoltaic array 110, leaving the middle part of the north edge of the photovoltaic array 110 uncovered. In yet another example, the edge screen 316 covers only parts of the south edge of the photovoltaic array 110, leaving the middle part of the south edge of the photovoltaic array 110 uncovered.

Also as shown in FIG. 3A, the photovoltaic array 120 is partially surrounded by a wind screen 320. In one embodiment, the wind screen 320 covers the entire west edge of the photovoltaic array 120, the entire east edge of the photovoltaic array 120, the four corners of the photovoltaic array 120, parts of the north edge of the photovoltaic array 120, and parts of the south edge of the photovoltaic array 120. In another embodiment, the wind screen 320 includes edge screens 322, 324, 326, and 328. For example, the edge screens 324 and 328 covers the west edge of the photovoltaic array 120 and the east edge of the photovoltaic array 120 respectively. In another example, the edge screen 322 covers only parts of the north edge of the photovoltaic array 120, leaving the middle part of the north edge of the photovoltaic array 120 uncovered. In yet another example, the edge screen 326 covers only parts of the south edge of the photovoltaic array 120, leaving the middle part of the south edge of the photovoltaic array 120 uncovered.

According to certain embodiments, the wind screens 310 and 320 are implemented according to at least FIG. 5A, FIG. 5B, FIG. 6A, FIG. 6B, FIG. 6C, FIG. 7, and/or FIG. 8.

As discussed above and further emphasized here, FIG. 3A is merely an example, which should not unduly limit the scope of the claims. One of ordinary skill in the art would recognize many variations, alternatives, and modifications. According to one embodiment, the wind screen 310 covers the entire north edge of the photovoltaic array 110, the entire south edge of the photovoltaic array 110, the four corners of the photovoltaic array 110, parts of the west edge of the photovoltaic array 110, and parts of the east edge of the photovoltaic array 110. According to another embodiment, the wind screen 320 covers the entire north edge of the photovoltaic array 120, the entire south edge of the photovoltaic array 120, the four corners of the photovoltaic array 120, parts of the west edge of the photovoltaic array 120, and parts of the east edge of the photovoltaic array 120.

According to yet another embodiment, the wind screen 310 covers the four corners of the photovoltaic array 110, only parts of the north edge of the photovoltaic array 110, only parts of the south edge of the photovoltaic array 110, only parts of the west edge of the photovoltaic array 110, and only parts of the east edge of the photovoltaic array 110. According to yet another embodiment, the wind screen 320 covers the four corners of the photovoltaic array 120, only parts of the north edge of the photovoltaic array 120, only parts of the south edge of the photovoltaic array 120, only parts of the west edge of the photovoltaic array 120, and only parts of the east edge of the photovoltaic array 120.

FIG. 3B is a simplified diagram showing each of one or more wind screens covering at least two sides and four corners of one photovoltaic array according to yet another embodiment of the present invention. This diagram is merely an example, which should not unduly limit the scope of the claims. One of ordinary skill in the art would recognize many variations, alternatives, and modifications.

As shown in FIG. 3B, the photovoltaic array 160 is partially surrounded by a wind screen 360. In one embodiment, the wind screen 360 covers the entire north edge of the photovoltaic array 160, the entire south edge of the photovoltaic array 160, the four corners of the photovoltaic array 160, parts of the west edge of the photovoltaic array 160, and parts of the east edge of the photovoltaic array 160. In another embodiment, the wind screen 360 includes edge screens 362, 364, 366, and 368. For example, the edge screens 364 and 368 covers the north edge of the photovoltaic array 160 and the south edge of the photovoltaic array 160 respectively. In another example, the edge screen 362 covers only parts of the east edge of the photovoltaic array 160, leaving the middle part of the east edge of the photovoltaic array 160 uncovered. In yet another example, the edge screen 366 covers only parts of the west edge of the photovoltaic array 160, leaving the middle part of the west edge of the photovoltaic array 110 uncovered.

Also as shown in FIG. 3B, the photovoltaic array 170 is partially surrounded by a wind screen 370. In one embodiment, the wind screen 370 covers the entire north edge of the photovoltaic array 170, the entire south edge of the photovoltaic array 170, the four corners of the photovoltaic array 170, parts of the west edge of the photovoltaic array 170, and parts of the east edge of the photovoltaic array 170. In another embodiment, the wind screen 370 includes edge screens 372, 374, 376, and 378. For example, the edge screens 374 and 378 covers the north edge of the photovoltaic array 170 and the south edge of the photovoltaic array 170 respectively. In another example, the edge screen 372 covers only parts of the east edge of the photovoltaic array 170, leaving the middle part of the east edge of the photovoltaic array 170 uncovered. In yet another example, the edge screen 376 covers only parts of the west edge of the photovoltaic array 170, leaving the middle part of the west edge of the photovoltaic array 170 uncovered.

According to certain embodiments, the wind screens 360 and 370 are implemented according to at least FIG. 5A, FIG. 5B, FIG. 6A, FIG. 6B, FIG. 6C, FIG. 7, and/or FIG. 8.

As discussed above and further emphasized here, FIG. 3B is merely an example, which should not unduly limit the scope of the claims. One of ordinary skill in the art would recognize many variations, alternatives, and modifications. According to one embodiment, the wind screen 360 covers the entire west edge of the photovoltaic array 160, the entire east edge of the photovoltaic array 160, the four corners of the photovoltaic array 160, parts of the north edge of the photovoltaic array 160, and parts of the south edge of the photovoltaic array 160. According to another embodiment, the wind screen 370 covers the entire west edge of the photovoltaic array 170, the entire east edge of the photovoltaic array 170, the four corners of the photovoltaic array 170, parts of the north edge of the photovoltaic array 170, and parts of the south edge of the photovoltaic array 170.

According to yet another embodiment, the wind screen 360 covers the four corners of the photovoltaic array 160, only parts of the north edge of the photovoltaic array 160, only parts of the south edge of the photovoltaic array 160, only parts of the west edge of the photovoltaic array 160, and only parts of the east edge of the photovoltaic array 160. According to yet another embodiment, the wind screen 370 covers the four corners of the photovoltaic array 170, only parts of the north edge of the photovoltaic array 170, only parts of the south edge of the photovoltaic array 170, only parts of the west edge of the photovoltaic array 170, and only parts of the east edge of the photovoltaic array 170.

FIG. 4A is a simplified diagram showing each of one or more wind screens covering at least four corners of one photovoltaic array according to yet another embodiment of the present invention. This diagram is merely an example, which should not unduly limit the scope of the claims. One of ordinary skill in the art would recognize many variations, alternatives, and modifications.

As shown in FIG. 4A, the photovoltaic array 110 is partially covered by a wind screen 810. In one embodiment, the wind screen 810 covers the four corners of the photovoltaic array 110. In another embodiment, the wind screen 810 includes edge screens 812, 814, 816, and 818. For example, the edge screen 814 covers only parts of the west edge of the photovoltaic array 110, leaving the middle part of the west edge of the photovoltaic array 110 uncovered. In another example, the edge screen 818 covers only parts of the east edge of the photovoltaic array 110, leaving the middle part of the east edge of the photovoltaic array 110 uncovered. In yet another example, the edge screen 812 covers only parts of the north edge of the photovoltaic array 110, leaving the middle part of the north edge of the photovoltaic array 110 uncovered. In yet another example, the edge screen 816 covers only parts of the south edge of the photovoltaic array 110, leaving the middle part of the south edge of the photovoltaic array 110 uncovered.

Also as shown in FIG. 4A, the photovoltaic array 120 is partially covered by a wind screen 820. In one embodiment, the wind screen 820 covers the four corners of the photovoltaic array 120. In another embodiment, the wind screen 820 includes edge screens 822, 824, 826, and 828. For example, the edge screen 824 covers only parts of the west edge of the photovoltaic array 120, leaving the middle part of the west edge of the photovoltaic array 120 uncovered. In another example, the edge screen 828 covers only parts of the east edge of the photovoltaic array 120, leaving the middle part of the east edge of the photovoltaic array 120 uncovered. In yet another example, the edge screen 822 covers only parts of the north edge of the photovoltaic array 120, leaving the middle part of the north edge of the photovoltaic array 120 uncovered. In yet another example, the edge screen 826 covers only parts of the south edge of the photovoltaic array 120, leaving the middle part of the south edge of the photovoltaic array 120 uncovered.

According to certain embodiments, the wind screens 810 and 820 are implemented according to at least FIG. 5A, FIG. 5B, FIG. 6A, FIG. 6B, FIG. 6C, FIG. 7, and/or FIG. 8.

FIG. 4B is a simplified diagram showing each of one or more wind screens covering at least four corners of one photovoltaic array according to yet another embodiment of the present invention. This diagram is merely an example, which should not unduly limit the scope of the claims. One of ordinary skill in the art would recognize many variations, alternatives, and modifications.

As shown in FIG. 4B, the photovoltaic array 160 is partially covered by a wind screen 860. In one embodiment, the wind screen 860 covers the four corners of the photovoltaic array 160. In another embodiment, the wind screen 860 includes edge screens 862, 864, 866, and 868. For example, the edge screen 864 covers only parts of the north edge of the photovoltaic array 160, leaving the middle part of the north edge of the photovoltaic array 160 uncovered. In another example, the edge screen 868 covers only parts of the south edge of the photovoltaic array 160, leaving the middle part of the south edge of the photovoltaic array 160 uncovered. In yet another example, the edge screen 862 covers only parts of the east edge of the photovoltaic array 160, leaving the middle part of the east edge of the photovoltaic array 160 uncovered. In yet another example, the edge screen 866 covers only parts of the west edge of the photovoltaic array 160, leaving the middle part of the west edge of the photovoltaic array 160 uncovered.

Also as shown in FIG. 4B, the photovoltaic array 170 is partially covered by a wind screen 870. In one embodiment, the wind screen 870 covers the four corners of the photovoltaic array 170. In another embodiment, the wind screen 870 includes edge screens 872, 874, 876, and 878. For example, the edge screen 874 covers only parts of the north edge of the photovoltaic array 170, leaving the middle part of the north edge of the photovoltaic array 170 uncovered. In another example, the edge screen 878 covers only parts of the south edge of the photovoltaic array 170, leaving the middle part of the south edge of the photovoltaic array 170 uncovered. In yet another example, the edge screen 872 covers only parts of the east edge of the photovoltaic array 170, leaving the middle part of the east edge of the photovoltaic array 170 uncovered. In yet another example, the edge screen 876 covers only parts of the west edge of the photovoltaic array 170, leaving the middle part of the west edge of the photovoltaic array 170 uncovered.

According to certain embodiments, the wind screens 860 and 870 are implemented according to at least FIG. 5A, FIG. 5B, FIG. 6A, FIG. 6B, FIG. 6C, FIG. 7, and/or FIG. 8.

As discussed above and further emphasized here, FIG. 4A and FIG. 4B are merely examples, which should not unduly limit the scope of the claims. One of ordinary skill in the art would recognize many variations, alternatives, and modifications. In one embodiment, the wind screen 810 covers one or more corners of the photovoltaic array 110. For example, the wind screen 810 covers only one corner of the photovoltaic array 110. In another example, the wind screen 810 covers only two corners of the photovoltaic array 110. In yet another example, the wind screen 810 covers only three corner of the photovoltaic array 110. In yet another example, the wind screen 810 covers all corners of the photovoltaic array 110, which includes a total of less than four corners or a total of more than four corners. In another embodiment, the wind screen 820 covers one or more corners of the photovoltaic array 120. For example, the wind screen 820 covers only one corner of the photovoltaic array 120. In another example, the wind screen 820 covers only two corners of the photovoltaic array 120. In yet another example, the wind screen 820 covers only three corner of the photovoltaic array 120. In yet another example, the wind screen 820 covers all corners of the photovoltaic array 120, which includes a total of less than four corners or a total of more than four corners.

In yet another embodiment, the wind screen 860 covers one or more corners of the photovoltaic array 160. For example, the wind screen 860 covers only one corner of the photovoltaic array 160. In another example, the wind screen 860 covers only two corners of the photovoltaic array 160.

In yet another example, the wind screen 860 covers only three corner of the photovoltaic array 160. In yet another example, the wind screen 860 covers all corners of the photovoltaic array 160, which includes a total of less than four corners or a total of more than four corners. In yet another embodiment, the wind screen 870 covers one or more corners of the photovoltaic array 170. For example, the wind screen 870 covers only one corner of the photovoltaic array 170. In another example, the wind screen 870 covers only two corners of the photovoltaic array 170. In yet another example, the wind screen 870 covers only three corner of the photovoltaic array 170. In yet another example, the wind screen 870 covers all corners of the photovoltaic array 170, which includes a total of less than four corners or a total of more than four corners.

Also, as discussed above and further emphasized here, FIGS. 1A, 1B, 2A, 2B, 3A, 3B, 4A, and 4B are merely examples, which should not unduly limit the scope of the claims. One of ordinary skill in the art would recognize many variations, alternatives, and modifications. According to certain embodiments, each of the photovoltaic array 110, the photovoltaic array 120, the photovoltaic array 160, and/or the photovoltaic array 170 is not oriented to have its four edges facing north, south, east, and west directions. According to some embodiments, each of the photovoltaic array 110, the photovoltaic array 120, the photovoltaic array 160, and/or the photovoltaic array 170 does not have a rectangular shape. For example, each of the photovoltaic array 110, the photovoltaic array 120, the photovoltaic array 160, and/or the photovoltaic array 170 has more than or less than four edges.

FIG. 5A and FIG. 5B are simplified diagrams showing a section of wind screen that covers one or more photovoltaic modules according to one embodiment of the present invention. These diagrams are merely examples, which should not unduly limit the scope of the claims. One of ordinary skill in the art would recognize many variations, alternatives, and modifications.

As shown in FIGS. 5A and 5B, a section of wind screen 410 includes a screen foundation 420 and one or more perforation blocks 430. For example, the section of wind screen 410 is at least a part of the edge wind screen 130, the edge wind screen 140, the edge wind screen 180, and/or the edge wind screen 190. In another example, the section of wind screen 410 is at least a part of the wind screen 210, the wind screen 220, the wind screen 260, and/or the wind screen 270. In yet another example, the section of wind screen 410 is at least a part of the wind screen 310, the wind screen 320, the wind screen 360, and/or the wind screen 370.

According to one embodiment, the screen foundation 420 includes a groove with a groove bottom surface 422 and groove side surfaces 424 and 426. For example, the one or more perforation blocks 430 are inserted into the groove and placed onto the groove bottom surface 422. In another example, the one or more perforation blocks 430 are also sandwiched between the groove side surfaces 424 and 426. According to another embodiment, the screen foundation 420 includes a foundation bottom surface 428. For example, the foundation thickness between the foundation bottom surface 428 and the groove bottom surface 422 is larger than zero and is represented by $H_1$. In another example, the foundation bottom surface 428 is placed onto the ground, and the one or more perforation blocks 430 do not touch the ground. According to yet another embodiment, the screen foundation 420 includes a concrete block. For example, the concrete block is a continuous concrete block (e.g., a slip-formed continuous concrete block). In another example, the concrete block is formed by slip-forming and then the control joints are cut. According to yet another embodiment, the screen foundation 420 includes one or more pre-cast blocks.

In one embodiment, the one or more perforation blocks 430 include one or more perforation patterns that are repeated along the length of the screen foundation 420. For example, the one or more perforation patterns provide one or more hollow regions. In another example, the one or more hollow regions have a total area that is equal to 30% to 70% of the surface area that includes all of hollow and non-hollow regions. In yet another example, the one or more perforation patterns are spaced uniformly on the surface of the one or more perforation blocks 430. In yet another example, the one or more perforation patterns are spaced non-uniformly on the surface of the one or more perforation blocks 430.

According to one embodiment, the one or more perforation blocks 430 include one or more concrete masonry units each with one or more perforations. According to another embodiment, the one or more perforation blocks 430 include one or more metal sheets each with one or more perforations. According to yet another embodiment, the one or more perforation blocks 430 have a height $H_2$. For example, the sum of $H_1$ and $H_2$ is larger than or equal to 3 feet but smaller than or equal to 5 feet, where $H_1$ represents the foundation thickness between the foundation bottom surface 428 and the groove bottom surface 422 and $H_2$ represents the height of the one or more perforation blocks 430. In another example, the sum of $H_1$ and $H_2$ is larger than or equal to 3 feet but smaller than or equal to 15 feet, where $H_1$ represents the foundation thickness between the foundation bottom surface 428 and the groove bottom surface 422 and $H_2$ represents the height of the one or more perforation blocks 430. In yet another example, the sum of $H_1$ and $H_2$ represents a height from a top surface 432 of the one or more perforation blocks 430 to the ground.

Also as shown in FIGS. 5A and 5B, a photovoltaic module 460 (e.g., a solar panel) is installed onto a support structure 470, and the support structure is placed onto the ground. According to one embodiment, the installed photovoltaic module 460 includes a top edge 462. According to another embodiment, the top edge 462 has a height from the ground, and the height is represented by $H_3$. For example, the photovoltaic module 460 is a low-profile ground-mounted photovoltaic module that has the height $H_3$ larger than or equal to 3 feet but smaller than or equal to 5 feet. In another example, the photovoltaic module 460 is a low-profile ground-mounted photovoltaic module that has the height $H_3$ larger than or equal to 3 feet but smaller than or equal to 15 feet. In yet another example, each photovoltaic array of photovoltaic arrays 110, 120, 160, and 170 includes multiple low-profile ground-mounted photovoltaic modules (e.g., the photovoltaic module 460), and is a low-profile ground-mounted photovoltaic array.

In one embodiment, the height $H_3$ of the top edge 462 is larger than or equal to the sum of $H_1$ and $H_2$, where $H_1$ represents the foundation thickness between the foundation bottom surface 428 and the groove bottom surface 422 and $H_2$ represents the height of the one or more perforation blocks 430. In another embodiment, the height $H_3$ of the top edge 462 is approximately equal to the sum of $H_1$ and $H_2$, where $H_1$ represents the foundation thickness between the foundation bottom surface 428 and the groove bottom surface 422 and $H_2$ represents the height of the one or more perforation blocks 430. In yet another embodiment, the height $H_3$ of the top edge 462 is equal to the sum of $H_1$ and $H_2$, where $H_1$ represents the foundation thickness between the foundation bottom surface 428 and the groove bottom surface 422 and $H_2$ represents the height of the one or more perforation blocks 430.

According to one embodiment, the one or more perforation blocks 430 are anchored to the screen foundation 420 that includes the groove with the groove side surfaces 424 and 426 that are sufficient to prevent the one or more perforation blocks 430 from rotating and/or flipping over. According to another embodiment, the one or more perforation blocks 430 are anchored to the screen foundation 420 that includes the groove by using one or more epoxy adhesive materials. According to yet another embodiment, the one or more perforation blocks 430 are anchored to the screen foundation 420 that includes the groove by using one or more steel rods.

According to certain embodiments, the distance between the installed photovoltaic module 460 and the section of wind screen 410 ranges from 50% to 200% of the spacing distance between two adjacent rows of photovoltaic modules within the same array block of a photovoltaic array (e.g., the photovoltaic array 110, the photovoltaic array 120, the photovoltaic array 160, and/or the photovoltaic array 170). In one embodiment, the spacing distance is measured as the shortest distance between a photovoltaic module on one row and another photovoltaic module on an adjacent row. For example, the spacing distance is measured as the shortest distance from the nearest edge of a photovoltaic module on one row to the nearest edge of another photovoltaic module on an adjacent row. In another example, the spacing distance is measured as the shortest distance between a photovoltaic module on one row and another photovoltaic module on an adjacent row, and these two photovoltaic modules are on the same column.

For example, each row of photovoltaic modules run from west to east in FIG. 1A, FIG. 2A, FIG. 3A, and/or FIG. 4A. In another example, each row of photovoltaic modules run from south to north in FIG. 1B, FIG. 2B, FIG. 3B, and/or FIG. 4B. In yet another example, the distance between the installed photovoltaic module 460 and the section of wind screen 410 is measured as the shortest distance from the one or more perforation blocks 430 to the installed photovoltaic module 460. In yet another example, the distance between the installed photovoltaic module 460 and the section of wind screen 410 is measured from a side surface 434 of the one or more perforation blocks 430 to the closest edge (e.g., a bottom edge 464) of the installed photovoltaic module 460 as shown in FIG. 5B.

FIG. 6A, FIG. 6B, and FIG. 6C are simplified diagrams showing one or more vehicle access ramps for a section of wind screen that covers one or more photovoltaic modules according to one embodiment of the present invention. These diagrams are merely examples, which should not unduly limit the scope of the claims. One of ordinary skill in the art would recognize many variations, alternatives, and modifications.

As shown in FIGS. 6A and 6B, vehicle access ramps 510 and 520 are provided for the section of wind screen 410. For example, the section of wind screen 410 includes the screen foundation 420 and the one or more perforation blocks 430. In another example, the screen foundation 420 includes two side surfaces 530 and 540. In yet another example, the side surface 530 is in contact with the access ramp 510. In yet another example, the side surface 540 is in contact with the access ramp 520.

As shown in FIG. 6C, at least one perforation block of the one or more perforation blocks 430 is removed to form an opening. For example, the removal of at least one perforation block of the one or more perforation blocks 430 is performed by hand by a worker and/or is performed with one or more pieces of equipment (e.g., a forklift), depending on size of the at least one perforation block that is to be removed. In another example, one or more vehicles can be driven onto the vehicle access ramp 510, through the opening, and onto the vehicle access ramp 520, so that the one or more vehicles move from one side of the section of wind screen 410 to the other side of the section of wind screen 410. In yet another example, one or more vehicles can be driven onto the vehicle access ramp 520, through the opening, and onto the vehicle access ramp 510, so that the one or more vehicles move from one side of the section of wind screen 410 to the other side of the section of wind screen 410.

As discussed above and further emphasized here, FIGS. 6A, 6B, and 6C are merely examples, which should not unduly limit the scope of the claims. One of ordinary skill in the art would recognize many variations, alternatives, and modifications. For example, in order for one or more persons to move from one side of the section of wind screen 410 to the other side of the section of wind screen 410, the vehicle access ramps 510 and 520 are not needed. In another example, at least one perforation block of the one or more perforation blocks 430 is removed to form an opening, and one or more persons can cross over the screen foundation 420 through the opening without any vehicle access ramp. In yet another example, if at least one perforation block of the one or more perforation blocks 430 is sufficiently small and therefore the section of wind screen 410 is sufficient low, a person can step over the section of wind screen 410 without removing any perforation block of the one or more perforation blocks 430, regardless of whether the vehicle access ramps 510 and 520 are used or not.

FIG. 7 is a simplified diagram showing a section of wind screen that covers one or more photovoltaic modules and one or more vehicle access ramps for the section of wind screen according to another embodiment of the present invention. This diagram is merely an example, which should not unduly limit the scope of the claims. One of ordinary skill in the art would recognize many variations, alternatives, and modifications.

As shown in FIG. 7, a section of wind screen 610 includes a screen foundation 620 and one or more perforated sheet metal segments 630. For example, the section of wind screen 610 is at least a part of the edge wind screen 130, the edge wind screen 140, the edge wind screen 180, and/or the edge wind screen 190. In another example, the section of wind screen 610 is at least a part of the wind screen 210, the wind screen 220, the wind screen 260, and/or the wind screen 270. In yet another example, the section of wind screen 610 is at least a part of the wind screen 310, the wind screen 320, the wind screen 360, and/or the wind screen 370.

According to one embodiment, the screen foundation 620 includes a groove with a groove bottom surface 622 and groove side surfaces 624 and 626. For example, the one or more perforated sheet metal segments 630 are inserted into the groove and placed onto the groove bottom surface 622. In another example, the one or more perforated sheet metal segments 630 are also sandwiched between the groove side surfaces 624 and 626. According to another embodiment, the screen foundation 620 includes a foundation bottom surface 628. For example, the foundation thickness between the foundation bottom surface 628 and the groove bottom surface 622 is larger than zero and is represented by $H_4$. In another example, the foundation bottom surface 628 is placed onto the ground, and the one or more perforated sheet metal segments 630 do not touch the ground. According to yet another embodiment, the screen foundation 620 includes a continuous concrete block (e.g., a slip-formed continuous concrete block).

In one embodiment, the one or more perforated sheet metal segments 630 include one or more perforation patterns that are repeated along the length of the screen foundation 620. For example, the one or more perforation patterns provide one or more hollow regions. In another example, the one or more hollow regions have a total area that is equal to 30% to 70% of the surface area that includes all of hollow and non-hollow regions. In yet another example, the one or more perforation patterns are spaced uniformly on the surface of the one or more perforation blocks 630. In yet another example, the one or more perforation patterns are spaced non-uniformly on the surface of the one or more perforation blocks 630.

According to yet another embodiment, the one or more perforated sheet metal segments 630 have a height H. For example, the sum of $H_A$ and $H_B$ is larger than or equal to 3 feet but smaller than or equal to 5 feet, where $H_A$ represents the foundation thickness between the foundation bottom surface 628 and the groove bottom surface 622 and $H_B$ represents the height of the one or more perforated sheet metal segments 630. In another example, the sum of $H_A$ and $H_B$ is larger than or equal to 3 feet but smaller than or equal to 15 feet, where $H_A$ represents the foundation thickness between the foundation bottom surface 628 and the groove bottom surface 622 and $H_B$ represents the height of the one or more perforated sheet metal segments 630. In yet another example, the sum of $H_A$ and $H_B$ represents a height from a top edge 632 of the one or more perforated sheet metal segments 630 to the ground.

Also as shown in FIG. 7, the photovoltaic module 460 (e.g., a solar panel) is installed onto the support structure 470, and the support structure is placed onto the ground. According to one embodiment, the installed photovoltaic module 460 includes the top edge 462. According to another embodiment, the top edge 462 has the height from the ground, and the height is represented by $H_3$.

In one embodiment, the height $H_3$ of the top edge 462 is larger than or equal to the sum of $H_A$ and $H_B$, where $H_A$ represents the foundation thickness between the foundation bottom surface 628 and the groove bottom surface 622 and $H_B$ represents the height of the one or more perforated sheet metal segments 630. In another embodiment, the height $H_3$ of the top edge 462 is approximately equal to the sum of $H_A$ and $H_B$, where $H_A$ represents the foundation thickness between the foundation bottom surface 628 and the groove bottom surface 622 and $H_B$ represents the height of the one or more perforated sheet metal segments 630. In yet another embodiment, the height $H_3$ of the top edge 462 is equal to the sum of $H_A$ and $H_B$, where $H_A$ represents the foundation thickness between the foundation bottom surface 628 and the groove bottom surface 622 and $H_B$ represents the height of the one or more perforated sheet metal segments 630.

According to one embodiment, the one or more perforated sheet metal segments 630 are anchored to the screen foundation 620 that includes the groove with the groove side surfaces 624 and 626 that are sufficient to prevent the one or more perforated sheet metal segments 630 from rotating and/or flipping over. According to another embodiment, the one or more perforated sheet metal segments 630 are anchored to the screen foundation 620 that includes the groove by using one or more epoxy adhesive materials. According to yet another embodiment, the one or more perforated sheet metal segments 630 are anchored to the screen foundation 620 that includes the groove by using one or more steel rods.

According to certain embodiments, the distance between the installed photovoltaic module 460 and the section of wind screen 610 ranges from 50% to 200% of the spacing distance between two adjacent rows of photovoltaic modules within the same array block of a photovoltaic array (e.g., the photovoltaic array 110, the photovoltaic array 120, the photovoltaic array 160, and/or the photovoltaic array 170). In one embodiment, the spacing distance is measured as the shortest distance between a photovoltaic module on one row and another photovoltaic module on an adjacent row. For example, the spacing distance is measured as the shortest distance from the nearest edge of a photovoltaic module on one row to the nearest edge of another photovoltaic module on an adjacent row. In another example, the spacing distance is measured as the shortest distance between a photovoltaic module on one row and another photovoltaic module on an adjacent row, and these two photovoltaic modules are on the same column.

For example, each row of photovoltaic modules run from west to east in FIG. 1A, FIG. 2A, FIG. 3A, and/or FIG. 4A. In another example, each row of photovoltaic modules run from south to north in FIG. 1B, FIG. 2B, FIG. 3B, and/or FIG. 4B. In yet another example, the distance between the installed photovoltaic module 460 and the section of wind screen 610 is measured as the shortest distance from the one or more perforated sheet metal segments 630 to the installed photovoltaic module 460. In yet another example, the distance between the installed photovoltaic module 460 and the section of wind screen 610 is measured from a side surface 634 of the one or more perforated sheet metal segments 630 to the closest edge (e.g., the bottom edge 464) of the installed photovoltaic module 460 as shown in FIG. 7.

Also as shown in FIG. 7, vehicle access ramps 640 and 650 are provided for the section of wind screen 610. For example, the screen foundation 620 includes two side surfaces 642 and 652. In yet another example, the side surface 642 is in contact with the access ramp 640. In yet another example, the side surface 652 is in contact with the access ramp 650.

In one embodiment, at least one perforation block of the one or more perforated sheet metal segments 630 is removed to form an opening. For example, one or more vehicles can be driven onto the vehicle access ramp 640, through the opening, and onto the vehicle access ramp 650, so that the one or more vehicles move from one side of the section of wind screen 610 to the other side of the section of wind screen 610. In another example, one or more vehicles can be driven onto the vehicle access ramp 650, through the opening, and onto the vehicle access ramp 640, so that the one or more vehicles move from one side of the section of wind screen 610 to the other side of the section of wind screen 610.

As discussed above and further emphasized here, FIGS. 5A and 5B are merely examples, which should not unduly limit the scope of the claims. One of ordinary skill in the art would recognize many variations, alternatives, and modifications. For example, the section of wind screen 410 includes a single concrete profile that is a combination of a foundation section and a perforation section.

FIG. 8 is a simplified diagram showing a section of wind screen that includes a unitary concrete profile covering one or more photovoltaic modules according to another embodiment of the present invention. This diagram is merely an example, which should not unduly limit the scope of the claims. One of ordinary skill in the art would recognize many variations, alternatives, and modifications.

As shown in FIG. 8, a section of wind screen 710 includes a unitary concrete profile that is a combination of a foundation section 720 and a perforation section 730. For example, the section of wind screen 710 is a monolithic section of wind screen. In another example, the section of wind screen 710 is made by using a single slip-formed concrete profile and then forming holes in the fresh concrete after extrusion. In yet another example, the section of wind screen 710 is pre-cast off site and then brought to the project site. In yet another example, the foundation section 720 and the perforation section 730 are parts of a unitary piece of concrete. In yet another example, the section of wind screen 710 covers one or more photovoltaic modules (e.g., the photovoltaic module 460).

In one embodiment, the section of wind screen 710 is at least a part of the edge wind screen 130, the edge wind screen 140, the edge wind screen 180, and/or the edge wind screen 190. In another embodiment, the section of wind screen 710 is at least a part of the wind screen 210, the wind screen 220, the wind screen 260, and/or the wind screen 270. In yet another embodiment, the section of wind screen 710 is at least a part of the wind screen 310, the wind screen 320, the wind screen 360, and/or the wind screen 370.

According to one embodiment, the foundation section 720 includes a foundation bottom surface 728. For example, the foundation bottom surface 728 is placed onto the ground, and the perforation section 730 does not touch the ground. According to another embodiment, the perforation section 730 includes one or more perforation patterns that are repeated along the length of the screen foundation 720. For example, the one or more perforation patterns provide one or more hollow regions. In another example, the one or more hollow regions have a total area that is equal to 30% to 70% of the surface area that includes all of hollow and non-hollow regions. In yet another example, the one or more perforation patterns are spaced uniformly on the surface of the perforation section 730. In yet another example, the one or more perforation patterns are spaced non-uniformly on the surface of the perforation section 730.

According to yet another embodiment, the monolithic section of wind screen 710 includes a unitary concrete profile that is a combination of the foundation section 720 and the perforation section 730, and the monolithic section of wind screen 710 has a height $H_T$. For example, $H_T$ is larger than or equal to 3 feet but smaller than or equal to 5 feet, where $H_T$ represents the height of the monolithic section of wind screen 710. In another example, $H_T$ is larger than or equal to 3 feet but smaller than or equal to 15 feet, where $H_T$ represents the height of the monolithic section of wind screen 710. In yet another example, $H_T$ represents a height from a top surface 732 of the perforation section 730 to the ground.

FIG. 9 is a simplified diagram showing one or more parts of a photovoltaic array that is at least partially covered by one or more wind screens as shown in FIG. 1A, FIG. 1B, FIG. 2A, FIG. 2B, FIG. 3A, FIG. 3B, FIG. 4A, and/or FIG. 4B according to certain embodiments of the present invention. This diagram is merely an example, which should not unduly limit the scope of the claims. One of ordinary skill in the art would recognize many variations, alternatives, and modifications.

According to one embodiment, photovoltaic modules 910, 912 and 914 are parts of a row of photovoltaic modules within the same array block, photovoltaic modules 920, 922 and 924 are parts of another row of photovoltaic modules within the same array block, and photovoltaic modules 930, 932 and 934 are parts of yet another row of photovoltaic modules within the same array block. For example, the rows of photovoltaic modules run from west to east as shown in FIG. 1A, FIG. 2A, FIG. 3A, and/or FIG. 4A. In another example, the rows of photovoltaic modules run from south to north as shown in FIG. 1B, FIG. 2B, FIG. 3B, and/or FIG. 4B.

According to another embodiment, the photovoltaic modules 910, 920 and 930 are parts of a column of photovoltaic modules within the same array block, the photovoltaic modules 912, 922 and 932 are parts of another column of photovoltaic modules within the same array block, and/or the photovoltaic modules 914, 924 and 934 are parts of yet another column of photovoltaic modules within the same array block. For example, the columns of photovoltaic modules run from south to north as shown in FIG. 1A, FIG. 2A, FIG. 3A, and/or FIG. 4A. In another example, the columns of photovoltaic modules run from south to north as shown in FIG. 1B, FIG. 2B, FIG. 3B, and/or FIG. 4B.

According to yet another embodiment, photovoltaic modules 1010, 1020, and 1030 are photovoltaic modules as parts of another array block, photovoltaic modules 1110, 1112 and 1114 are photovoltaic modules as parts of yet another array block, and a photovoltaic module 1210 is a photovoltaic module as part of yet another array block. For example, within a same array block, each row of photovoltaic modules runs from west to east and each column of photovoltaic modules runs from south to north, as shown in FIG. 1A, FIG. 2A, FIG. 3A, and/or FIG. 4A. In another example, within a same array block, each row of photovoltaic modules runs from south to north and each column of photovoltaic modules runs from west to east, as shown in FIG. 1B, FIG. 2B, FIG. 3B, and/or FIG. 4B.

According to certain embodiments, the photovoltaic module 460 represents the photovoltaic module 910, the photovoltaic module 912, the photovoltaic module 914, the photovoltaic module 920, the photovoltaic module 922, the photovoltaic module 924, the photovoltaic module 930, the photovoltaic module 932, and/or the photovoltaic module 934. According to some embodiments, the photovoltaic module 460 represents the photovoltaic module 1010, the photovoltaic module 1020, the photovoltaic module 1030, the photovoltaic module 1110, the photovoltaic module 1112, the photovoltaic module 1114, and/or the photovoltaic module 1210.

As shown in FIG. 9, within the same array block, the pitch for two adjacent rows is represented by $P_r$, and the pitch for two adjacent columns is represented by $P_c$. In one embodiment, within the same photovoltaic array, the block spacing between two adjacent array blocks in the column direction (e.g., between the arrays blocks 112 and 116, between the arrays blocks 114 and 118, between the arrays blocks 122 and 126, between the arrays blocks 124 and 128, between the arrays blocks 162 and 164, between the arrays blocks 166 and 168, between the arrays blocks 172 and 174, and/or between the arrays blocks 176 and 178) is represented by $S_1$. In another embodiment, within the same photovoltaic array, the block spacing between two adjacent array blocks in the row direction (e.g., between the arrays blocks 112 and 114, between the arrays blocks 116 and 118, between the arrays blocks 122 and 124, between the arrays blocks 126 and 128, between the arrays blocks 162 and 166, between the arrays blocks 164 and 168, between the arrays blocks 172 and 176, and/or between the arrays blocks 174 and 178) is represented by $S_2$.

According to one embodiment, $S_1$ ranges from two to three times of $P_r$ in magnitude, where $S_1$ represents the block spacing between two adjacent array blocks in the column direction within the same photovoltaic array, and $P_r$ represents the pitch for two adjacent rows within the same array block. According to another embodiment, $S_2$ ranges from two to three times of $P_c$ in magnitude, where $S_2$ represents the block spacing between two adjacent array blocks in the row direction within the same photovoltaic array, and $P_c$ represents the pitch for two adjacent columns within the same array block.

According to certain embodiments, one or more wind screens for low-profile ground-mounted photovoltaic arrays are provided. According to some embodiments, one or more components of one or more wind screens provide one or more of the following features: reducing wind loads on exterior rows and edges of a photovoltaic array, and/or facilitating a single efficient design for the entire array instead of two different designs for each wind region. According to certain embodiments, one or more components of one or more wind screens include one or more of the following additional and/or alternative features: one or more complete array enclosures, one or more partial array enclosures, one or more mechanically anchored screens, one or more ballasted wind screens, one or more perforated wind screens, one or more screen foundations, one or more gravity anchored wind screens, and/or one or more epoxy anchored wind screens.

According to some embodiments, any suitable combination of one or more of the following features is provided: one or more types of photovoltaic arrays, one or more types of screen foundations, one or more types of perforation blocks, and/or one or more types of geometries. For example, the one or more types of photovoltaic arrays include: one or more low-profile photovoltaic arrays, one or more arrays of any plan size, one or more tracker photovoltaic arrays, one or more fixed-tilt photovoltaic arrays; and/or one or more concentrating photovoltaic arrays. In another example, the one or more types of screen foundations include: one or more masonry foundations, one or more precast concrete foundations, and/or one or more concrete slip-formed foundations. In yet another example, one or more types of perforation blocks include: one or more perforated concrete blocks, one or more perforated masonry blocks, and/or one or more perforated metal blocks. In yet another example, the one or more types of geometries include one or more fully enclosed photovoltaic arrays, one or more photovoltaic arrays with wind screens on two opposing sides, one or more photovoltaic arrays with wind screens on two opposing sides and four corners, and/or one or more photovoltaic arrays with wind screens on four corners.

Certain embodiments of the present invention provide one or more wind fences for a system of one or more photovoltaic arrays and therefore reduce the amount of one or more structural materials (e.g., steel, concrete, fasteners, gears, and/or motors) of the system. Some embodiments of the present invention provide one or more wind fences for a system of one or more photovoltaic arrays and therefore reduce wind loads on the system. Certain embodiments of the present invention provide one or more wind fences for a system of one or more photovoltaic arrays and therefore enhance the ability of the system to withstand higher wind loads.

According to another embodiment, a wind screen for one or more photovoltaic arrays includes a screen foundation including a concrete block, and one or more perforation blocks on the concrete block. For example, the wind screen is configured to cover at least a first side of each array of the one or more photovoltaic arrays. In another example, the wind screen is implemented according to at least FIG. 1A, FIG. 1B, FIG. 2A, FIG. 2B, FIG. 3A, FIG. 3B, FIG. 5A, FIG. 5B, FIG. 6A, FIG. 6B, FIG. 6C, FIG. 7, and/or FIG. 8.

According to yet another embodiment, a wind screen for one or more photovoltaic arrays includes a screen foundation including a concrete block, and one or more perforation blocks on the concrete block. For example, the wind screen is configured to cover at least one corner of each array of the one or more photovoltaic arrays. In another example, the wind screen is implemented according to at least FIG. 4A, FIG. 4B, FIG. 5A, FIG. 5B, FIG. 6A, FIG. 6B, FIG. 6C, FIG. 7, and/or FIG. 8.

Although specific embodiments of the present invention have been described, it will be understood by those of skill in the art that there are other embodiments that are equivalent to the described embodiments. For example, various embodiments and/or examples of the present invention can be combined. Accordingly, it is to be understood that the invention is not to be limited by the specific illustrated embodiments, but only by the scope of the appended claims.

What is claimed is:

1. A photovoltaic system, comprising:
one or more photovoltaic arrays; and
a wind screen comprising:
a screen foundation including an elongated concrete block comprising an elongated groove extending within the concrete of the concrete block; and
a plurality of perforation blocks disposed within the elongated groove of the concrete block, adhered within the elongated groove of the concrete block by one or more adhesive materials, and including a plurality of perforations extending therethrough;
wherein at least a portion of the wind screen is configured to support a vehicle; and
wherein the wind screen covers at least a first side of each array of the one or more photovoltaic arrays.

2. The photovoltaic system of claim 1 wherein:
the concrete block includes a bottom surface on the ground.

3. The photovoltaic system of claim 1 wherein the plurality of perforations include one or more perforation patterns that are repeated along a length of the concrete block of the screen foundation.

4. The photovoltaic system of claim 1 wherein:
the plurality of perforation blocks include concrete masonry units; and
each concrete masonry unit includes one or more perforations.

5. The photovoltaic system of claim 1 wherein:
the plurality of perforation blocks include metal sheets; and
each metal sheet includes one or more perforations.

6. The photovoltaic system of claim 1 wherein:
the wind screen includes a first edge wind screen; and
the first edge wind screen covers the first side of each array of the one or more photovoltaic arrays.

7. The photovoltaic system of claim 1 wherein:
the wind screen includes one or more screens; and
the one or more screens at least partially surround the one or more photovoltaic arrays respectively.

8. The photovoltaic system of claim 7 wherein:
the one or more screens include a first screen and a second screen;
the one or more photovoltaic arrays include a first photovoltaic array and a second photovoltaic array;

the first screen covers two opposing sides and four corners of the first photovoltaic array; and the second screen covers two opposing sides and four corners of the second photovoltaic array.

9. The photovoltaic system of claim 1 wherein:

the wind screen includes one or more enclosing screens; and the one or more enclosing screens completely surround the one or more photovoltaic arrays.

10. The photovoltaic system of claim 9 wherein:

the one or more enclosing screens include a first enclosing screen and a second enclosing screen;

the one or more photovoltaic arrays include a first photovoltaic array and a second photovoltaic array;

the first enclosing screen completely surrounds the first photovoltaic array; and the second enclosing screen completely surrounds the second photovoltaic array.

11. The photovoltaic system of claim 1 wherein:

each of the one or more photovoltaic arrays includes one or more photovoltaic modules;

each of the one or more photovoltaic modules is installed and associated with a first height between a top edge and the ground; and the first height is larger than or equal to three feet but smaller than or equal to fifteen feet.

12. The photovoltaic system of claim 11 wherein:

the concrete block includes a bottom surface on the ground; and the plurality of perforation blocks disposed within the elongated groove of the concrete block is associated with a second height from a top surface or a top edge to the ground; and the second height is approximately equal to the first height.

13. The photovoltaic system of claim 11 wherein:

the concrete block includes a bottom surface on the ground; and the plurality of perforation blocks disposed within the elongated groove of the concrete block is associated with a second height from a top surface or a top edge to the ground; and the second height is equal to the first height.

14. The photovoltaic system of claim 1 wherein:

the concrete block of the screen foundation includes a first side surface and a second side surface;

the first surface is in contact with a first ramp configured to support the vehicle; and the second surface is in contact with a second ramp configured to support the vehicle.

15. The photovoltaic system of claim 1 wherein the wind screen further covers at least a second side of each array of the one or more photovoltaic arrays, the first side and the second side being opposite to each other.

16. The photovoltaic system of claim 15 wherein:

the wind screen includes a first edge wind screen and a second edge wind screen;

the first edge wind screen covers the first side of each array of the one or more photovoltaic arrays;

the second edge wind screen covers the second side of each array of the one or more photovoltaic arrays.

17. The photovoltaic system of claim 1 wherein the concrete block is a continuous concrete block.

18. A photovoltaic system, comprising:

one or more photovoltaic arrays; and a wind screen comprising:

a screen foundation including an elongated concrete block comprising an elongated groove extending within the concrete of the concrete block; and a plurality of perforation blocks disposed within the elongated groove of the concrete block, adhered within the elongated groove of the concrete block with one or more adhesive materials, and including a plurality of perforations extending therethrough;

wherein at least a portion of the wind screen is configured to support a vehicle; and wherein the wind screen covers at least one corner of each array of the one or more photovoltaic arrays.

19. The photovoltaic system of claim 18 wherein:

the concrete block includes a bottom surface on the ground.

20. The photovoltaic system of claim 18 wherein the plurality of perforations include one or more perforation patterns that are repeated along a length of the concrete block of the screen foundation.

21. The photovoltaic system of claim 18 wherein:

the plurality of perforation blocks include concrete masonry units; and each concrete masonry unit includes one or more perforations.

22. The photovoltaic system of claim 18 wherein:

the plurality of perforation blocks include metal sheets; and each metal sheet includes one or more perforations.

23. The photovoltaic system of claim 18 wherein:

each of the one or more photovoltaic arrays includes one or more photovoltaic modules;

each of the one or more photovoltaic modules is installed and associated with a first height between a top edge and the ground; and the first height is larger than or equal to three feet but smaller than or equal to fifteen feet.

24. The photovoltaic system of claim 23 wherein:

the concrete block includes a bottom surface on the ground; and the plurality of perforation blocks disposed within the elongated groove of the concrete block is associated with a second height from a top surface to the ground; and the second height is approximately equal to the first height.

25. The photovoltaic system of claim 23 wherein:

the concrete block includes a bottom surface on the ground; and the plurality of perforation blocks disposed within the elongated groove of the concrete block is associated with a second height from a top surface to the ground; and the second height is equal to the first height.

26. The photovoltaic system of claim 18 wherein:

the concrete block of the screen foundation includes a first side surface and a second side surface;

the first surface is in contact with a first ramp configured to support the vehicle; and the second surface is in contact with a second ramp configured to support the vehicle.

27. The photovoltaic system of claim 18 is configured to cover at least four corners of each array of the one or more photovoltaic arrays.

28. The photovoltaic system of claim 18 wherein the concrete block is a continuous concrete block.

* * * * *